March 7, 1967   C. J. BARBAGALLO ETAL   3,308,437
DIGITAL DATA PROCESSING CONVERSION AND CHECKING APPARATUS
Original Filed Jan. 27, 1958   20 Sheets-Sheet 2
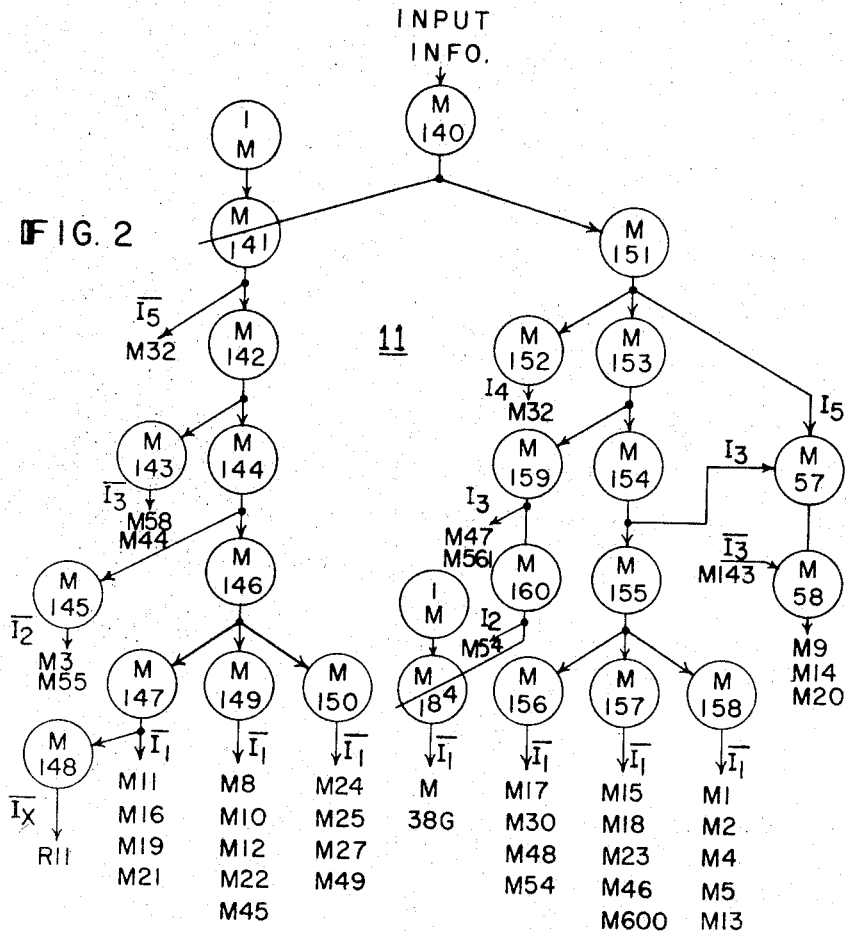
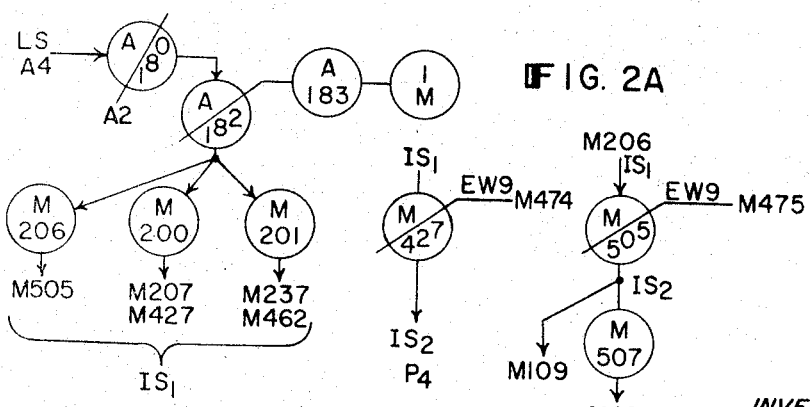
INVENTORS
C. J. BARBAGALLO
E. S. FABISZEWSKI
BY
ATTORNEY

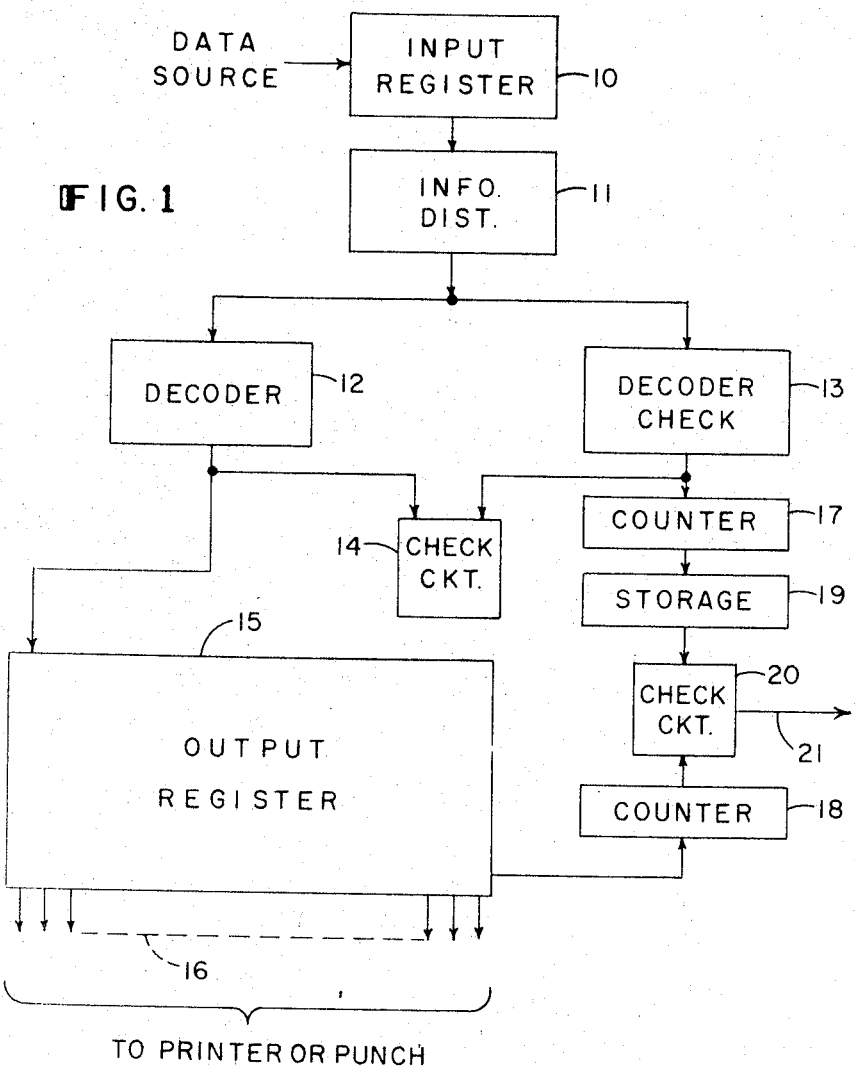

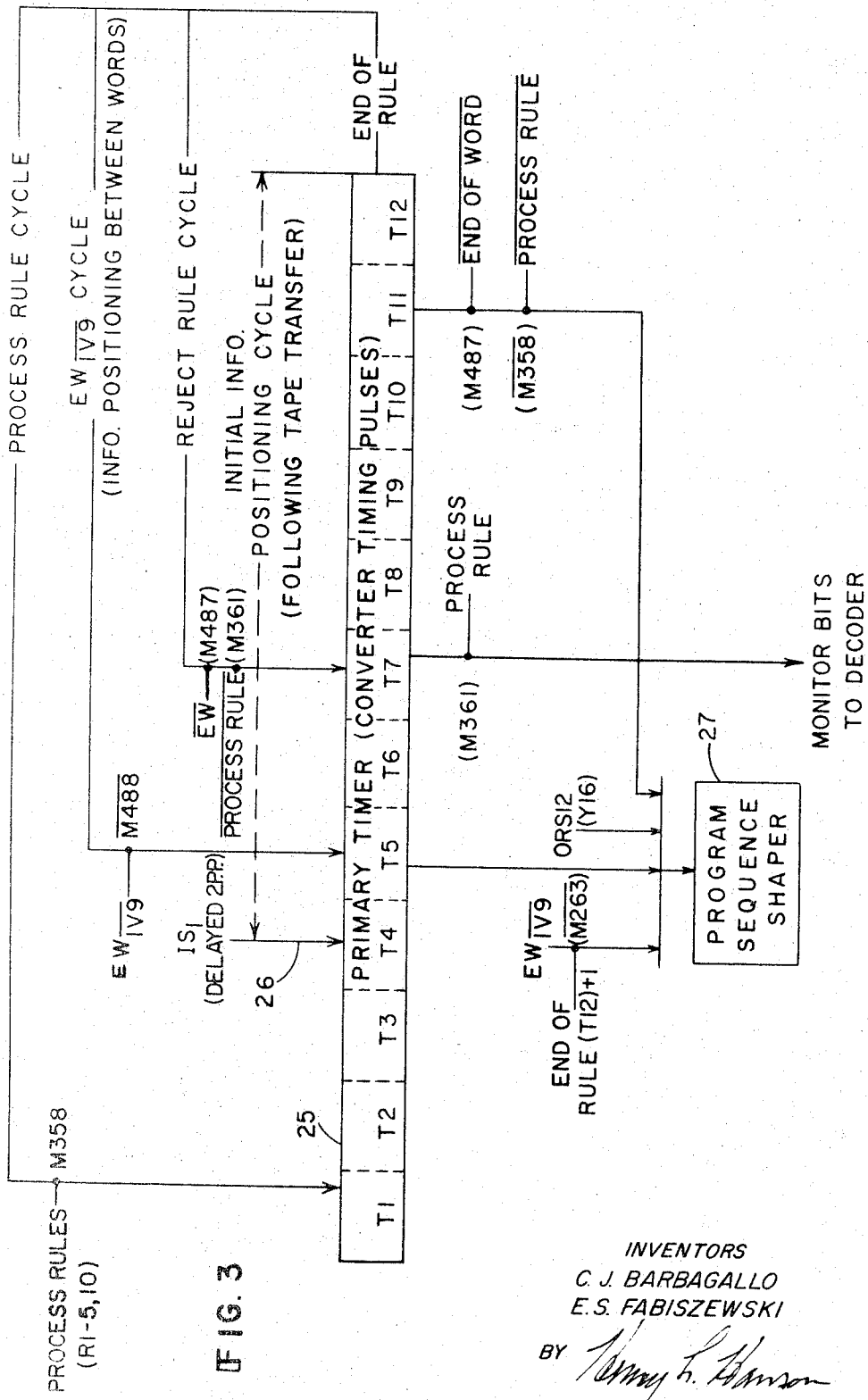

INVENTORS
C. J. BARBAGALLO
E. S. FABISZEWSKI
BY
ATTORNEY

March 7, 1967     C. J. BARBAGALLO ETAL     3,308,437
DIGITAL DATA PROCESSING CONVERSION AND CHECKING APPARATUS
Original Filed Jan. 27, 1958     20 Sheets-Sheet 14

INVENTORS
C. J. BARBAGALLO
E. S. FABISZEWSKI
BY
ATTORNEY

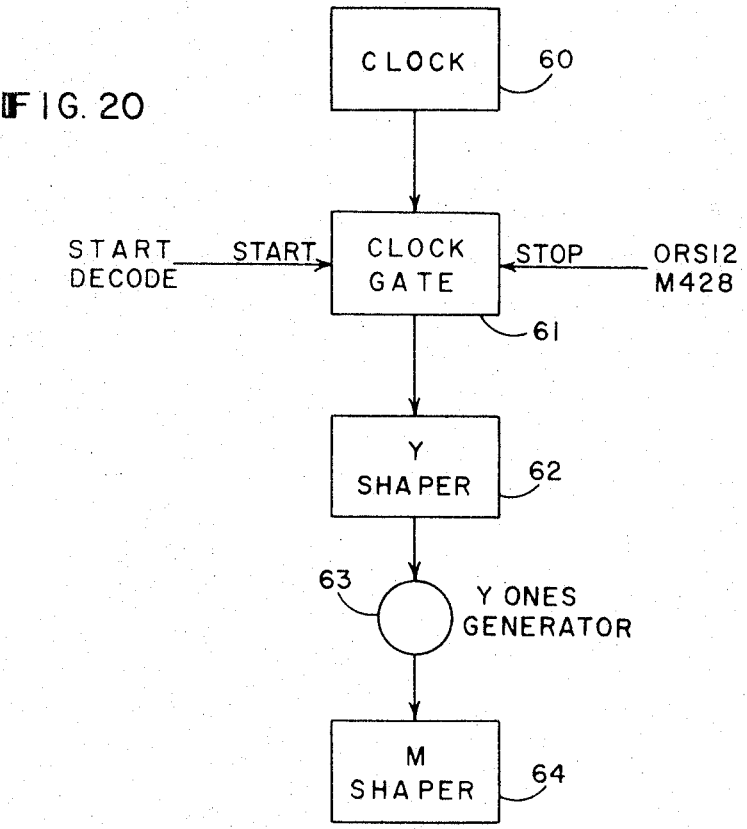

United States Patent Office 3,308,437
Patented Mar. 7, 1967

3,308,437
DIGITAL DATA PROCESSING CONVERSION AND CHECKING APPARATUS
Charles J. Barbagallo, Needham, and Edward S. Fabiszewski, Lexington, Mass., assignors to Honeywell Inc., a corporation of Delaware
Original application Jan. 27, 1958, Ser. No. 711,512, now Patent No. 3,130,386, dated Apr. 21, 1964. Divided and this application July 19, 1963, Ser. No. 301,228
8 Claims. (Cl. 340—172.5)

This application is a division of an application entitled "Digital Data Processing Conversion and Checking Apparatus," by Charles J. Barbagallo and Edward S. Fabiszewski, Serial Number 711,512, filed January 27, 1958, now Patent No. 3,130,386 which is assigned to the assignee of the present application.

A general object of the present invention is to provide a new and improved apparatus for manipulating digital data. More specifically, the present invention is concerned with apparatus particularly useful in the manipulation of data which is in the process of being rearranged or converted from one code into another.

In a co-pending application of Henry W. Schrimpf entitled, "Electrical Apparatus, Ser. Number 636,256, filed Jan. 25, 1957, there is disclosed a digital data processing apparatus which is useful in the performing of prearranged programs for manipulating data either for scientific or business purposes. The information in that application takes the form of fixed length machine words which may be made up of a series of binary coded decimal numbers, alphabetic characters, or other designations for signs and symbols. While data in this form is conveniently handled in the data processing apparatus, the decoding of the data for output purposes requires that the information be rearranged or converted to a form which is compatible with the output utilization apparatus. Such output apparatus most generally takes the form of a high speed printer or tabulating card punch. The digital data processing apparatus, such as that disclosed in the copending Schrimpf application may be programmed to convert data from one code into another. However, the apparatus is seldom being used effectively or efficiently under such circumstances as a code conversion problem has special requirements which are not necessarily compatible with an over-all data processing problem. Accordingly, the present invention is directed to a specialized apparatus useful in the conversion of data in a variable code which may comprise a variable number of bits for each character into a fixed type code. In one form of the present invention, the apparatus was arranged to convert a variable machine code involving binary coded data into a fixed type code of the Hollerith type.

In order to manipulate data as provided herein, it is necessary to provide a programmed decoding or converting apparatus which is capable of selectively converting the machine data into the desired output code. The ability to program the conversion operation adds considerably to the over-all flexibility of the conversion process to thereby enhance the usefulness of the apparatus.

It is accordingly a more specific object of the present invention to provide a new and improved programmed apparatus for converting digital data in one form into another.

The program for the present converting apparatus is produced by a series of rule generators which may be variably selected by way of a manual plugboard source to produce the decoding that is desired. These rule generators produce control signals which effect the conversion or rejection of variable numbers of bits from the digital data applied to the input. In addition, the apparatus for producing the converting or decoding rules may provide means for generating other programmed control signals.

A further more specific object of the present invention is to provide a new and improved digital data converting apparatus for decoding a variable digital code into a fixed digital code.

Another object of the present invention is to provide in combination with the foregoing objects a programmed data conversion apparatus employing a plurality of rule generating circuits variably selected by way of a programmed plugboard.

To insure the accuracy of the final output from the conversion apparatus, the conversion operation should be checked in its entirety. It has been found that the checking circuitry must encompass all possible areas where the data is manipulated to insure that the conversion that takes place is accomplished without error. In certain areas of the conversion the checking is accomplished by well known methods of duplicate operation. However, in other areas the duplication of equipment becomes expensive and consequently other means must be provided for this checking.

One of the unique areas of checking in the present apparatus is in the checking of the data in the output storage register which stores the coded data which has been stored for use with the output utilization apparatus. This checking involves the counting of the number of bits inserted into the output register and a further counting of the number of bits that have been shifted out of the output register. The shifting out of the output register includes all of the elements of the storage register and in addition the circuitry which is used for directly activating the output utilization apparatus. This circuitry comprises, in the present form of apparatus, an electromagnetic relay circuit which has contacts included in the output register checking circuit.

A still further more specific object is therefor to provide a new and improved checking and control apparatus for a digital data manipulating circuit utilizing means for counting the number of bits inserted into a storage register and shifted out of the storage register.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Of the drawings:
FIGURE 1 is a diagrammatic representation of the machine elements incorporated in the present invention;
FIGURE 2 is a logical diagram of information distributing circuitry used in the present invention;
FIGURE 2A illustrates the logical circuitry which may be used to produce the initial set signals IS for use in the circuitry;
FIGURE 3 is a diagrammatic representation of the timer associated with the conversion operation;
FIGURE 4 is the logical representation of the apparatus of FIGURE 3;
FIGURE 5 is a diagrammatic representation of the program plugboard and rule generating circuitry of the present apparatus;
FIGURE 6 is a schematic showing of the portion of the rule generators of FIGURE 5;
FIGURE 7 is a diagrammatic representation of a portion of the rule distributing circuitry used for supplying signals to the input register shift circuits;
FIGURE 8 shows the logical detail of the apparatus of FIGURE 7;

FIGURE 20 is a diagrammatic showing of some of the timing and control circuits.

Figure 4:
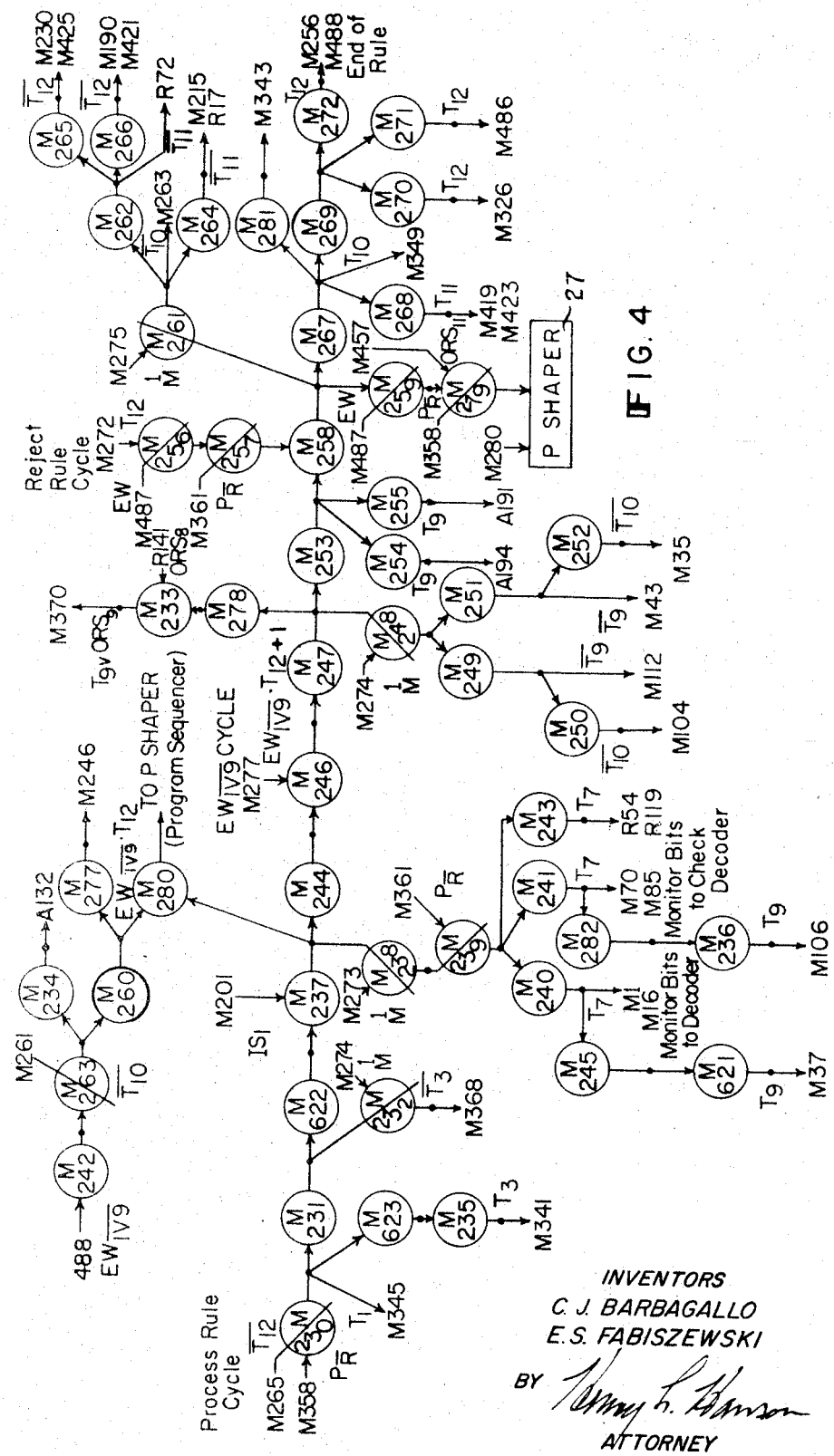

Referring first to FIGURE 1, the numeral 10 represents an input register which is adapted to receive from input apparatus digital data which is processed in the manner disclosed in a co-pending application of Charles J. Barbagallo, et al. entitled Electrical Apparatus, Serial Number 718,336, filed February 28, 1958, now Patent No. 3,037,193. The input register 10 is adapted to store this digital data and to include circuitry whereby the data may be serially shifted therefrom into an information distribution circuit 11.

The information distribution circuitry 11 supplies output signals which are adapted to pass to two decoder circuits 12 and 13. The decoder circuits are adapted to take the serial information from the information distribution circuit 11 and convert it into a fixed type code such as the Hollerith code. The duplication of decoder 12 and 13 is for purposes of checking with the check of this decoding operation being effected by a duplication check circuit 14. The check is made on each bit fed out from the decoder circuits to provide complete checking of the decoding operation.

The output from the decoder 12 passes to an output register 15, the latter of which is arranged to store information in the format of a tabulating card which contains information in the Hollerith type code. The information from the decoder 12 passes in the output register in a serial manner and is shifted along through the output register until the information has been moved to the right-hand side of the register. Information is then shifted out on the output lines 16 to a utilization apparatus which may be, for example, a tabulating card punch, or a printer which is adapted to be operated by a Hollerith type code.

In order to check the operation of the output register, a special monitoring circuit has been provided in the form of a pair of counters 17 and 18. The counter 17 is connected to the output of the decoder 13 and is adapted to count all of the bits transferred out of the decoder check circuit 13. The count produced by the counter 17 is shifted into a storage circuit 19 where it will be held pending a generation of a checking count by the counter 18. The counter 17 is operative during that portion of the operating cycle wherein information is being shifted into the output register. The counter circuit 18 will be operative while the data in the output register is being manipulated either for readout or for repeat operation. The counter 18 is arranged to be counting the same information that the counter 17 counted only on the next operative cycle when new information is being transferred into the output register. As the new information is moved into the output register 15, the old information is transferred out to the counter 18. As soon as the old information has been transferred out, it will be compared with the count stored in the storage circuit 19 by the comparison or check circuit 20. If there is an error, a signal will appear on the output line 21 which may be used for stopping the operation of the apparatus.

FIGURE 2 illustrates the logical detail of the information distribution circuit 11 of FIGURE 1. This information distribution circuit is illustrated in terms of magnetic core logical circuitry with each of the elements, appearing as circles on the drawing, representing a bistable magnetic core which is adapted to store and, with its control windings, shift information to the circuitry. The use of magnetic cores for performing logical functions is known in the art and a discussion of the details of such circuitry and their manner of representation will be found in an article by R. D. Kodis, et al. entitled, "Logical and Control Functions Performed With Magnetic Cores," printed in the Proceedings of the I.R.E., volume 43, Number 3, March, 1955. In this logical circuitry, the information coming in may be used either for asserting the associated core or for inhibiting the write-in from another source. In the drawings, an arrow coming into a core represents an assert winding on the core. Further, a line crossing a core represents an inhibit winding on the core.

The information distribution circuit of FIGURE 2 is provided for generating a number of control signals at selected times in accordance with the information shifted in through the input core M140. Whenever a one is shifted through the core M140, it will, upon the next shift, insert a one into the core M151 and also produce an inhibit signal on the inhibit winding of the core M141. The core M141 has a ones generator 1M connected to the input thereof and applying a series of ones to the core which are normally written into the core. However, the presence of a signal on the inhibit winding on the core M141 will prevent the writing in from the ones generator 1M. This type of circuit is sometimes referred to as a complementing circuit. Thus the complement path of information is on the output of the core M141. The assertive or non-complemented form of the information will be on the output of the core M151. The signals from the core M141 is arranged to be propagated through the cores M142–M150. The signals from the core M151 are propagated through the cores M152–M160, M57, M58 and to the inhibit winding on a core M184.

The timing for this information distribution circuit may be illustrated by the following timing chart:

TABLE I

| Time | $I_1$ | $\bar{I}_1$ | $I_2$ | $\bar{I}_2$ | $\bar{I}_3$ | $I_4$ | $\bar{I}_4$ | $I_5$ |
|---|---|---|---|---|---|---|---|---|
| 1 | | | | | | | | |
| 2 | | | | | | | | |
| 3 | | | | | | | | | 0 |
| 4 | | | | | | 0 | $\bar{0}$ | 1 |
| 5 | | | | | $\bar{0}$ | 1 | $\bar{1}$ | 2 |
| 6 | | | 0 | $\bar{0}$ | $\bar{1}$ | 2 | $\bar{2}$ | 3 |
| 7 | 0 | $\bar{0}$ | 1 | $\bar{1}$ | $\bar{2}$ | 3 | $\bar{3}$ | 4 |
| 8 | 1 | $\bar{1}$ | 2 | $\bar{2}$ | $\bar{3}$ | 4 | $\bar{4}$ | 5 |
| 9 | 2 | $\bar{2}$ | 3 | $\bar{3}$ | $\bar{4}$ | 5 | $\bar{5}$ | |
| 10 | 3 | $\bar{3}$ | 4 | $\bar{4}$ | $\bar{5}$ | | | |
| 11 | 4 | $\bar{4}$ | 5 | $\bar{5}$ | | | | |
| 12 | 5 | $\bar{5}$ | | | | | | |

More specifically, the table illustrates the timing relationship for the particular bits coming into the information distribution register. At time T1, the information from the input register will represent the $2^0$ bit. The $2^0$ bit will not appear on the output lines $I_1$–$I_5$ until times T3. At time T3, the core M151 will have an output corresponding to the $2^0$ bit from the input register. At time T4, the output of the core M151 will represent the $2^1$ bit of the input information. At time T5, the output line $I_5$ from core M151 will represent $2^2$ bit.

The lack of a bit on the core M140 will permit a signal from the ones generator 1M to be written into the core M141. Thus at time T3, if the $2^0$ bit was not present on the input of the core M140, or a zero was present on the input of the core M140, the output of the core M141 will be a signal $\overline{I_5}$. In a similar manner the complement or negation of the information will be found on the output of the core M143, said output bearing the designation $\overline{I_3}$. At time T5 the $\overline{2^0}$ bit will appear in the form of an assertive signal. At time T6, the $\overline{2^1}$ bit will appear on the output of the core M143.

The other cores of the information distribution circuit are arranged to provide the signals $I_1$, $\overline{I_1}$, $I_2$, $\overline{I_2}$, $I_3$, $\overline{I_3}$, $I_4$, $\overline{I_4}$, $I_5$ and $\overline{I_5}$. These information signals are utilised in the decoding circuitry to be discussed in greater detail in FIGURES 12, 13 and 14.

FIGURE 2A illustrates the logical circuitry which may be used to produce the initial set signals IS for use in the circuitry. This signal is produced from a lead sentinel which takes the form of a signal pulse preceding any of the information from the input register. This lead sentinel, and the manner in which it is derived, is discussed more fully in the above mentioned application of Charles J. Barbagallo, et al. The lead sentinel is normally used to write into a core A182, the latter feeding three output cores M201, M200 and M206. An inhibit winding is provided on the core A182 and this inhibit winding is adapted to be energized by a ones generator 1M connected to the inhibit winding by way of a core A183.

A further initial set signal $IS_2$ is used in the apparatus and this is derived from the $IS_1$ signal which is fed to the core M427 and the core M505. These latter two cores are adapted to be inhibited by an end word 9 signal $EW_9$ when such signal is present. The core M505 feeds a further core M507 and is used for distributing the initial set signal $IS_2$ to other parts of the circuitry.

FIGURE 3 represents the diagrammatic showing of the primary timer used in the converting or decoding operation. The primary timer may comprise a magnetic core shift register capable of producing up to twelve timing pulses as a signal or monitor bit is shifted through the stages of the register. As a matter of convenience, the presently described apparatus is arranged so that a maximum of twelve timing signals are required in order to effect the processing of one operational rule which may be, for example, the conversion of one set of information signals from the input register. The operational rules are discussed in detail below.

More specifically, the timing register is referred to by the numeral 25 with the initial set pulse $IS_1$ being applied to the primary timer registers at location T4 by an input line 26. The shifting of the signal inserted in the position T4 should be effected so that the signal will travel down through the position T12 to define the end of rule at which time the signal will be passed out in an output line and arranged to be dropped back into the timer location required by the next function to be performed. If a process rule is to be performed, the signal will pass back by way of core M358 and be inserted into the first position at time T1. In the event that there is an end of word cycle, the signal on the output of the position T12 will feed back through the circuit including core M488 to the position T5.

If a reject rule is to be performed, that is where certain information is not to be utilized in the conversion operation, the output of the position T12 will be fed back through the cores M487 and M361 to the position T7.

Certain outputs are provided from this primary timer 25 and these include the outputs to a program sequence shaper 27 the latter having buffered to the input thereof a signal from the stage T5, a signal from the output register core OR512, a signal from the stage T11 by way of the core M487 and M358 and a signal from circuitry indicating $\overline{Ew_{1 \text{ or } 9}}$, the latter coming in by way of the core M263.

Figure 12:
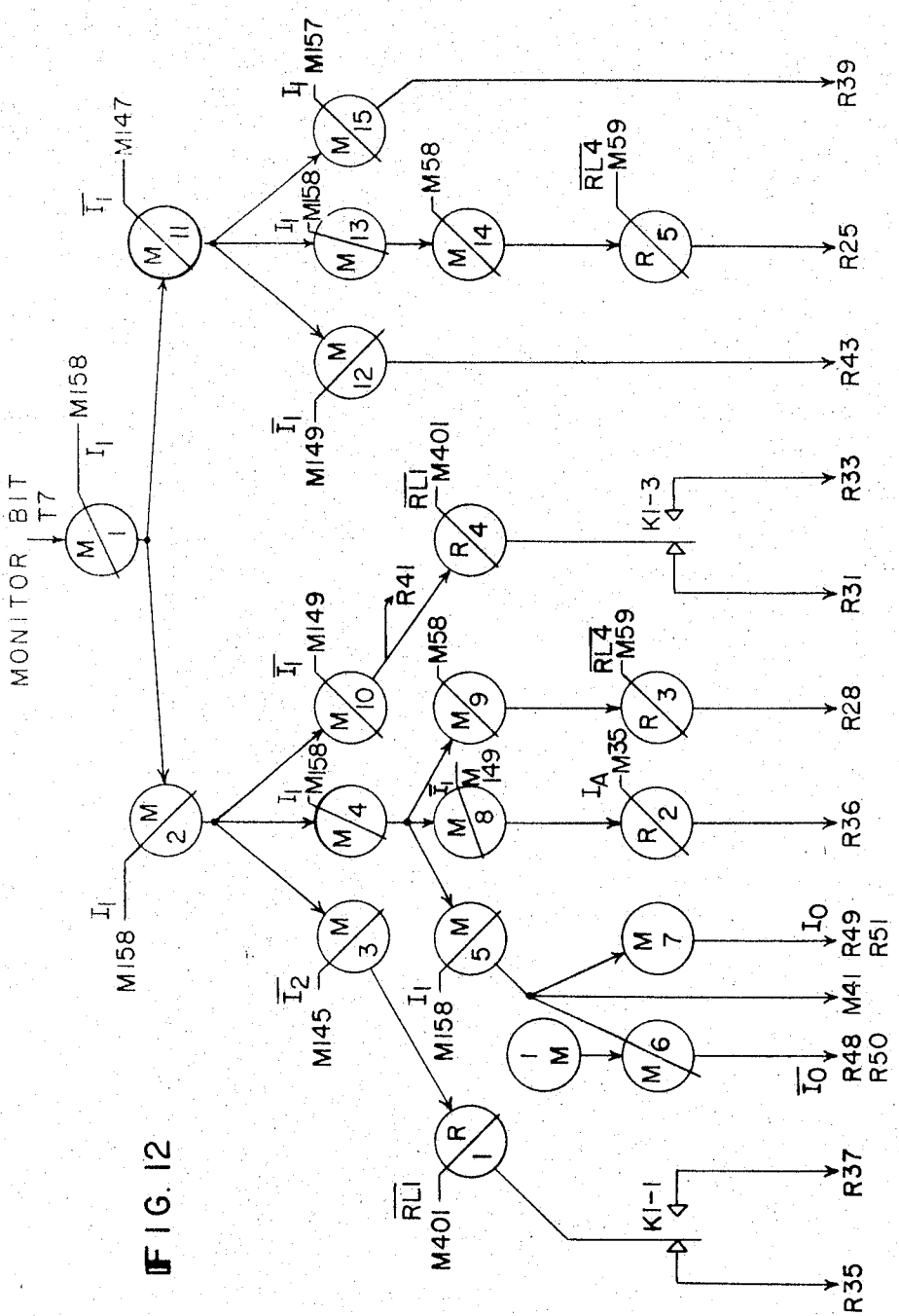
FIGURE 12 illustrates logically a portion of the decoding circuitry of the present apparatus.
Figure 13:
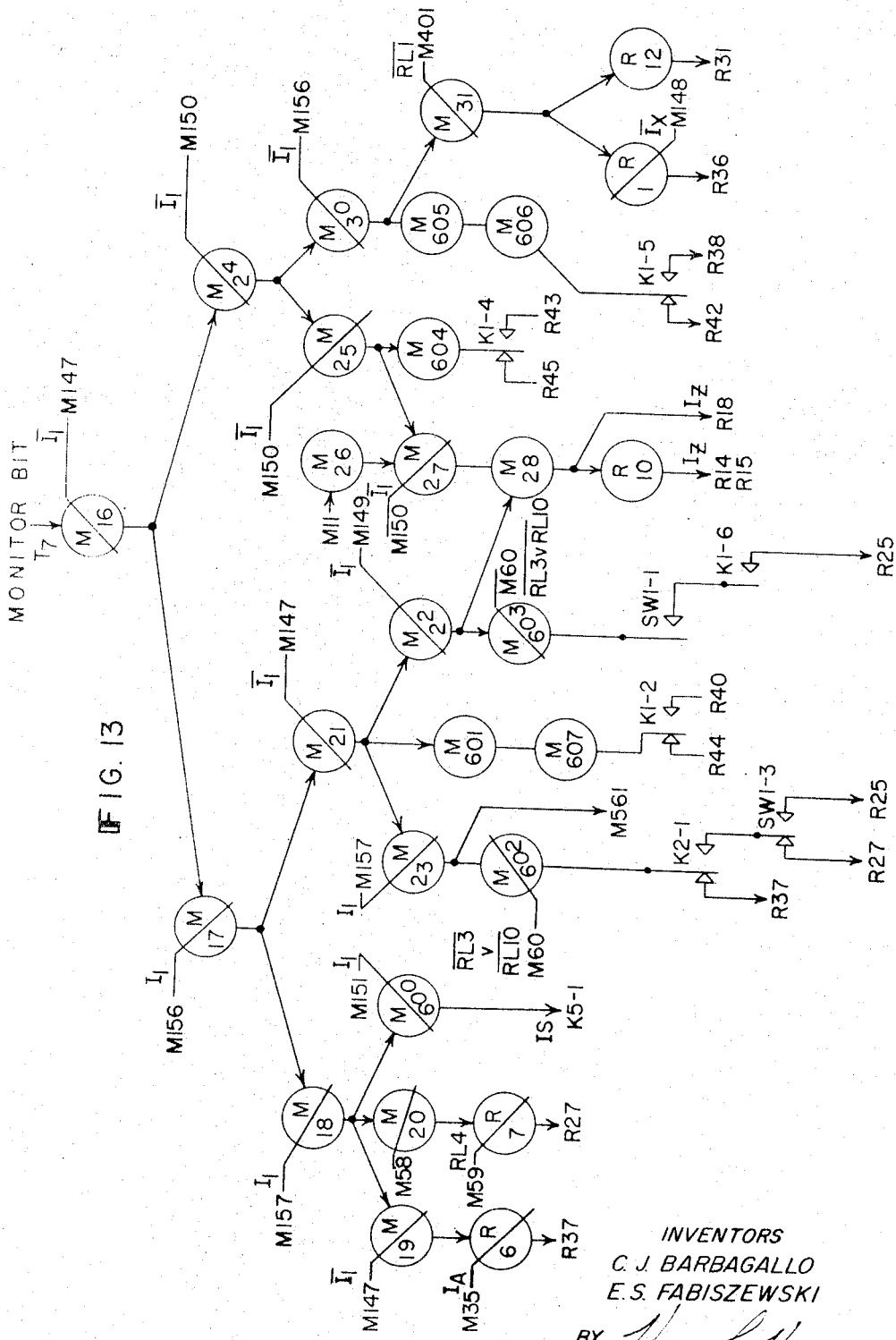
FIGURE 13 illustrates a further portion of the decoder circuitry in logical detail.

Another output is derived from the timing stage T7 by way of the core M361 and this provides a monitor bit for use in the decoder circuitry of FIGURES 12 and 13.

The detailed logic for this primary timer is illustrated in FIGURE 4. The timing stages take the form of bistable magnetic cores. Referring specifically to FIGURE 4, the initial set pulse $IS_1$ is applied to the core M237. In the course of the operation of the apparatus, the signal inserted in the core M237 will be shifted along through the cores M244, M246, M247, M253, M258, M267, M269 and M272. The core M272 when shifted produces the timing pulse T12. It will be noted in the core circuitry just traced that there are a number of output leads connected to other cores. Thus the output of the core M237 is connected to the core M280. The core M280, when shifted, supplies a signal to the program sequence shaper 27. It will also be noted that the core M280 has other input signals applied thereto such as by way of the core M488, the core M263, the latter of which has an inhibit winding thereon from the core M261. The information from core M263 is inserted into the core M260 and then core M280. The signal $\overline{Ew_{1 \text{ v } 9}}$ is derived from the program plugboard circuitry and corresponds to the input referred to on the program sequence shaper 27 of FIGURE 3.

Another output from the core M237 is applied to an inhibit winding on the core M238. This will, upon the presence of an output pulse or one, have the effect of inhibiting the core M238 which has an input from the core M273. This will mean that the output of the core M238 will not be effective during this particular timing period to inhibit the write-in of a signal on the core M239. Thus, at time T6, it is possible to insert into the cores M240, M241 and M243 a monitor bit which is used in the decoder or converting circuitry. The outputs of the cores M240, M241, and M243 will be a T7 timing pulse. Further, the cores M240 and M241 feed further cores M245 and M282 respectively. The core M245 feeds core M621 and produces the output timing signal T9. The core M282 feeds the core M236 to produce a further T9 timing pulse.

In order to produce the negation of the timing pulses $\overline{T9}$ and $\overline{T10}$, the output of the core M247 is applied to the inhibit winding on the core M248 to prevent the writing into the core M248 of a one from a ones generator core M274. This will in turn prevent any signal from being written into either of the cores M249 and M251. On the next shift from the cores M249 and M251 no signal will be present so that the output of the cores M249 and M251 will not be producing a signal at time T9 to thereby give the apparatus an assertive signal $\overline{T9}$. The cores M250 and M252 provide an additional time delay which will produce a further timing signal $\overline{T10}$.

Inasmuch as the T9 signal is used in a number of places, the circuit has been so arranged that the T9 signal may be derived from a number of different cores. Thus, the core M278, connected to the output of the core M247 feeds a core M233 whose output is a T9 timing signal. In a similar manner, the core M253 feeds two additional cores M254 and M255, these cores also producing T9 timing pulses on the output.

The P shaper 27 receives an additional signal from the core M258 by way of cores M259 and M279, providing inhibit signals are not applied to the inhibit lines on the cores M259 and M279.

The output of the core M258 is also coupled to an inhibit winding on the core M261, the latter having ones normally applied thereto by way of the core M275. The output of core M261 will then be the negation of the signal T10 or $\overline{T10}$. Further, this will produce in the output cores M262 and M264 the negation of the T11 signal or $\overline{T11}$. In addition the cores M265 and M266 will produce the negation of the T12 timing signal or $\overline{T12}$.

The core M267 has its output connected to the core M268, the latter of which produces the timing signal T11. The timing signal T10 is derived directly from the core M267. The timing signal T12 is derived from the outputs of the cores M270, M271 and M272.

In order to insert a timing signal back in the input of the primary timer line, it is necessary that there be no $\overline{T12}$ signal from the core M265 applied to the inhibit line of the core M230. This will permit the write-in of a process rule signal from the core M358, the latter core being shown in FIGURE 10.

When a signal is written into the core M230, the shift of the core will produce the timing signal T1. The timing signal T1 will be read into the core M231 as well as into the core M623. The signal from core M623 will then be written into the core M235, the latter when shifted producing the timing pulse T3.

The output of the core M231 is adapted to have its signal applied to the inhibit winding on the core M232 to inhibit the ones applied thereto by a ones generator M274. This will produce the negation of the timing signal T3 or $\overline{T3}$. The core M622, also connected to be set by the core M231, will read into the core M237 to complete the cycle of operation.

It will be noted that a signal may be written into the core M246 from the core M277. This is a programmed signal selected from plugboard circuitry to be described below. The signal inserted here is $EW_{\overline{1v9}}$.

It will also be noted that a signal can be written into the core M258 and this will occur when a reject rule cycle is to be performed. The signal will be applied by way of the core M256 and M257 provided the inhibit windings on these respective cores are not active.

The over-all functioning of this primary timer with respect to the conversion circuits and the other components of the present apparatus will be discussed in detail below.

Figure 5:
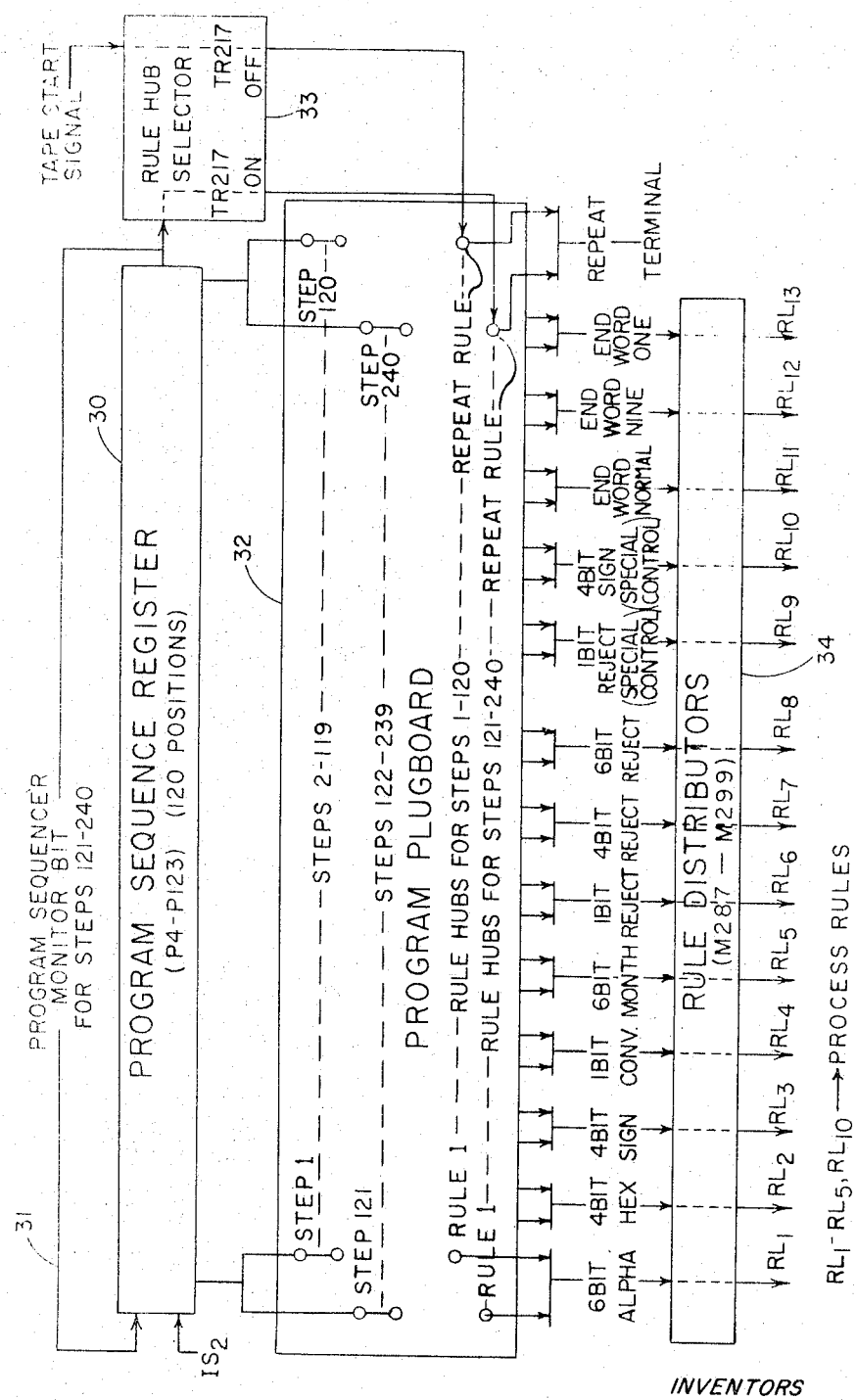

FIGURE 5 illustrates diagrammatically the program sequence register and the program plugboard which is associated with this register. The circuitry of FIGURE 5 illustrates the elements essential in generating the various rules for programming the operation of the decoder or converting apparatus. By definition in the present apparatus the decoding of any one particular group of information bits is limited to a maximum of 240 position steps. Each step is capable of being programmed so that a variable number of bits from the input register are transferred through the decoder and thence into the output register. Thus, an operator using the apparatus may want to process six bits from the input register. The six bits may be for an alphabetic conversion or for a month conversion, the latter being for a special monthly designation. If a six bit alphabetic conversion is to be made, six bits from the input register will be transferred through the converter or decoder and they will be inserted in the output register in a particular column in the form of the Hollerith code which represents the particular six bit alphabetic character examined. The particular rule for this is defined as rule RL1. For a six bit month conversion, the rule will be rule RL5. In the event that six bits are to be rejected, the rule signal produced will be rule RL8.

The following rules are available for an operator for programming the operation of the described apparatus. These rules are as follows:

(1) *Six bit alphabetic.*—Six bits are read from the input register and converted to an alphanumeric character.

(2) *Four bit hexadecimal.*—Four bits are read from the input register and converted to a number 0–9 or a symbolic letter B–G.

(3) *Four bit sign.*—Four bits are read from the input register and convert to sign information.

(4) *One bit conversion.*—One bit is read from the input register and converted as a one or zero.

(5) *Six bit month.*—Six bits are read from the input register and converted to one of the twelve monthly designations which may be set up in a selected field in the Hollerith code.

(6) *One bit reject.*—One bit is read from the input register and is discarded.

(7) *Four bit reject.*—Four bits are read from the input register and discarded.

(8) *Six bit reject.*—Six bits are read from the input register and discarded.

(9) *One bit reject (special control).*—May be used for control of terminal equipment.

(10) *Four bit sign (special control).*—May be used for control of terminal equipment.

(11) *End of word normal* ($EW_{\overline{1v9}}$).—Used to indicate that a particular machine word has been ended providing that word is not the word 1 or the word 9.

(12) *End word 9* ($EW_9$).—Used to designate that the word just processed was the word 9.

(13) *End word 1* ($EW_1$).—Used to designate that the word 1 from the input register has been processed.

In the end word rules, rules 11, 12 and 13, the circuitry is arranged so that eight shifts take place in the input register in order to move the next machine word into position for processing. During this shifting, four bits from the register are examined and discarded and these bits are the weight count bits associated with each machine word. The operation of the weight count check circuits are not discussed in detail herein. In addition, four additional bits are shifted out of the register and these bits do not contain information but rather sentinels or spacing bits.

Considering FIGURE 5 more specifically, the rule generating circuit and the plugboard circuitry therefore comprise a program sequence register 30, the latter of which includes a series of bistable magnetic cores connected in a shift register configuration. The cores carry designations P4 through P123. The program sequence register is adapted to have a bit inserted at one end thereof by the initial set signal $IS_2$. This bit is adapted to be shifted through the register for 120 steps and then recirculated back through the register by way of the feed back path 31 for an additional 120 steps.

The individual steps are defined as electrical signals existing on terminals of a program plugboard 32, the latter having a total of 240 separate steps available for the selection of the rules. Inasmuch as each core of the sequence register is used for two steps, each core is adapted to be connected to two separate step positions on the plugboard. Thus the core feeding the step 1 is also connected to feed the step 121. If the first step (step 1) of a particular converting program is to produce a four bit hexadecimal conversion, the step 1 position on the plugboard will be plugged to the rule 2 position on the plugboard. If the first step is to be a six bit alphabetic conversion, the step 1 position on the board will be plugged to the rule 1 position on the plugboard.

To further facilitate the programming of the apparatus, the plugboard is arranged so that a rule which has been performed in one step may be repeated by plugging the next step to the repeat rule terminals in the plugboard. These repeat rule terminals are arranged to provide a feed back to the last rule circuit activated so that it will be repeated.

In order to step from the step 120 to the step 121, the rule hub selector 33 must be activated so that a monitor bit may be fed back in the register 30 to provide the steps 121 to 240. The rule hub selector 33 includes a thyratron relay which conditions the circuits for the second 120 steps. The detail of this is more fully considered in FIGURE 6.

The output of the program plugboard is applied through cores designated as rule distributors, the same being illustrated diagrammatically in the block 34.

Figure 6:
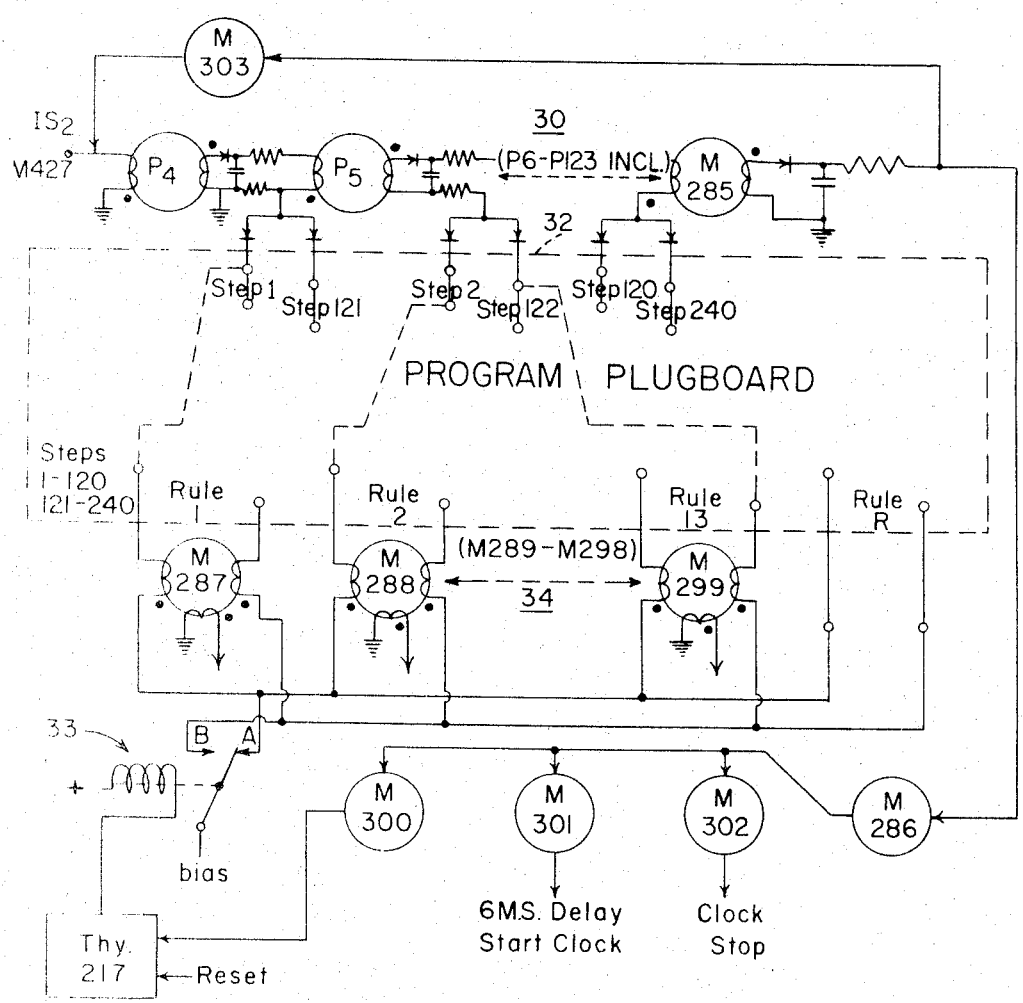

The details of the core circuitry for the programmed sequence register and the rule distributors is more fully considered in FIGURE 6. In this figure, the sequence register 30 shows the magnetic shift register circuitry utilized with the input signal $IS_2$, the latter being used to set the input core P4 at the start of the programming operation. The shifting of the P cores will result in the IS signal in the core P4 being shifted into the core P5. The signal shifted out of the core P4 will also be applied to the step 1 terminal in the program plugboard 32. The signal from this step 1 terminal may be plugged to any one of the thirteen rule terminals for the steps 1-120. Thus, the step 1 terminal may be connected to the upper terminal for rule 1 to provide for the production of a six bit alphabetic conversion.

After the programmed sequence register has shifted through the first 120 steps, the bit in the register will be shifted out through the core M285 into the core M303. The bit will also be shifted into the core M286 and then the cores M300, M301 and M302. The shifting of a signal from the core M300 will result in the thyratron 217 being activated so that its associated relay will switch the blade from position A to positon B. The shifting of the relay from position A to position B will permit the signals from the step cores to be written into the M cores of the distributor 34. The selected windings on the right side of the M cores in the rule distributor will be energized. This energization made for the cores in the distributor 34 will be used for steps 121-240.

For the next 120 steps, the respective step terminals in the program plugboard will be plugged to the rule cores on the terminals 4, steps 121-240. Thus step terminal 122 may be plugged to the right-hand terminal for rule 13 for the writing into the core 299 by the program sequence monitor bit as it is shifted out of the core P5.

All of the rules except rules 11, 12 and 13 may be repeated.

If the next step in a conversion involves the repeating of a previous rule, a connection is made from that step to the repeat rule terminals on the plugboard. Once the repeat rule is plugged on the distributor 34, the next rule to be repeated will be picked up on the plugboard at the last step wherein a rule was repeated. When stepping from step 120 to 121, the repetition of a rule can not be carried across the gap and consequently must be set up as done initially in the first 120 steps. Once set up after 121, the procedure will be as for the normal repetition of the repeat rules.

When the program has been completed, the conversion of the data in the register will have been completed. The apparatus when being conditioned to read new information into the input register will affect a resetting of the thyratron 217 and cause the de-energization of the relay in circuit therewith so that the program plugboard will be conditioned to produce the steps 1-120 for the next converting operation.

Figure 7:
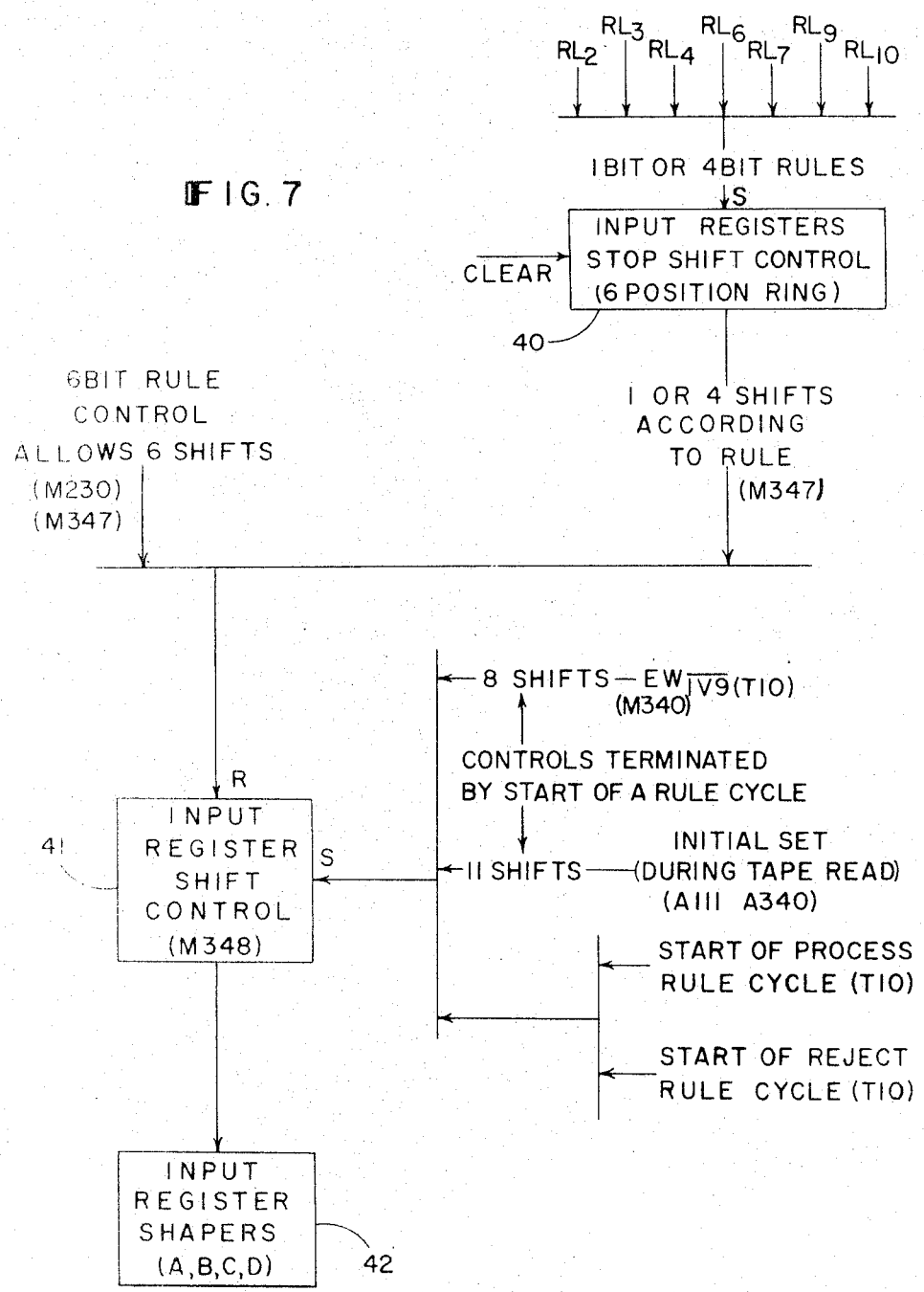

FIGURE 7 illustrates diagrammatically the basic functions required to supply signals for shifting the data in the input register 10 of FIGURE 1 once it has been filled by an input read from storage. In the processing of information, as discussed above, the number of bits transferred from the input register at any one transfer will be dependent upon the particular rule that is to be performed in the converting or decoding process. The rule cores of the rule distributor 34 of FIGURE 5 are examined in the circuitry of FIGURE 7 to determine the number of shifts to be performed. These rule cores supply signals to an input register stop shift control circuit 40. This circuit, as illustrated in greater detail in FIGURE 8, includes a six position counter ring. The output from this circuit 40 is operatively associated with a six bit rule control circuit on an input register shift control circuit 41. The input register shift control circuit 41 has an additional input which is capable of producing an eight bit shift, an eleven bit shift, as well as a signal indicative that the process cycle or the reject cycle has been started at time T10.

The output of the input register shift control circuit 41 is connected to a series of shapers indicated in the block 42. These shapers are used to supply the shifting signals for the serial shifting of the information in the input register 10.

The input register shift control circuit 41 is in effect a circuit which may be set into an active state by a set pulse. This circuit will continue to produce calling for the shifting of information in the input register until a signal comes through from a rule input which will automatically terminate the operation of the shift control circuit at a selected time T6. Thus, when an initial set signal is applied and it is desired to produce eleven shifts, the input register shift control circuit will be set and will continue to produce the eleven shifts. The circuit will then continue to produce shifts until the reset signal from the rule input is applied to stop the circuit. If there are eleven shifts from an initial set and the first rule is a six bit rule, a total of seventeen shifts will occur in the input register. If the first rule is a one bit rule, a total of twelve shifts will take place.

In a similar manner, between words, there is an eight bit shift and this will be followed by the shifts directed by the next rule for the next word.

Figure 8:
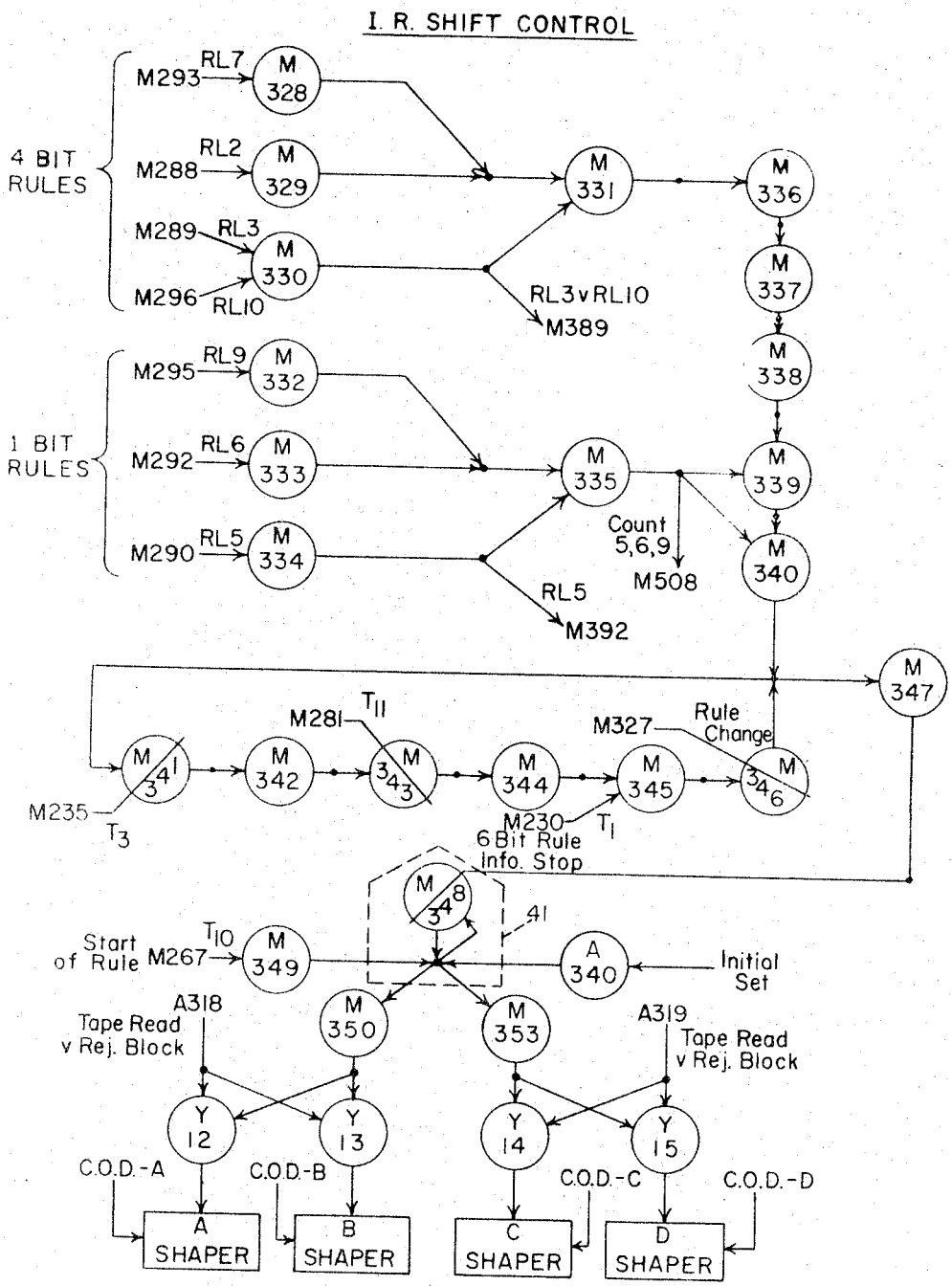

The detailed logic for this shift control circuit is illustrated in FIGURE 8. In this figure, the input shift control circuit 41 will be seen to comprise a magnetic core flip-flop circuit including a core M348 which is adapted to be set by an input either from the core M349 or the core A340. The signal is fed into the core M349 is the signal signifying the start of any particular rule which has been selected. The signal fed into the core A340 is an initial set signal derived from the input register. The initial set signal is the one which calls for an initial eleven bit shift.

One the input register shift control circuit 41 has been set either by a start of rule signal or an initial set signal, the circuit will remain set until a signal is applied thereto by an inhibit winding on the core A348. This inhibit signal will be applied in accordance with the type of rule that is next selected. If there is a one bit rule to be performed, the particular 1 bit rule which is to be performed will cause a signal to be written into one of the cores M332, M333, or M334. The shifting of these cores by way of core M335 and M340 sets the circuits for the creating of the necessary shifts of the input register. The timing on these signals is such that when the start of rule signal at time T10 is written into the core M349, a signal will be written into the core M347. On the next shift, at time T11, the inhibit signal from the core M347 will be active on the inhibit winding of the core M348 so that when the core M349 is shifted, the core M348 can not be set. However, each of the cores M350 and M353 do have signals written therein by the core M349 and will supply a single shift control signal for the shapers A, B, C, and D.

In the event that a four bit rule is to be performed, a four bit rule signal will be written into one of the selected cores M328, M329 or M 330. The signal will then be shifted through the cores M331, M336, M337, M338 and M339 into the circuit including cores M340 and M347 which will result in an inhibit signal being applied to the core M348. This will permit the application of four shift pulses to the input register shapers.

The signals coming in for the one bit and four bit rules, in addition to passing into the core M347 will also be passed into the core M341, the latter being located in a closed loop six bit counting ring including cores M341–M346. The use of this counting ring is to provide a means whereby a rule may be repeated without the necessity of shifting in a rule signal to one of the input cores. Further, the six bit rule signal is applied at time T1 to the core M345. This signal will be effective to provide the desired timing for shifting the input register six bits. The operation of this circuit will be more fully explained in conjunction with the description of the overall system operation.

Figure 9:
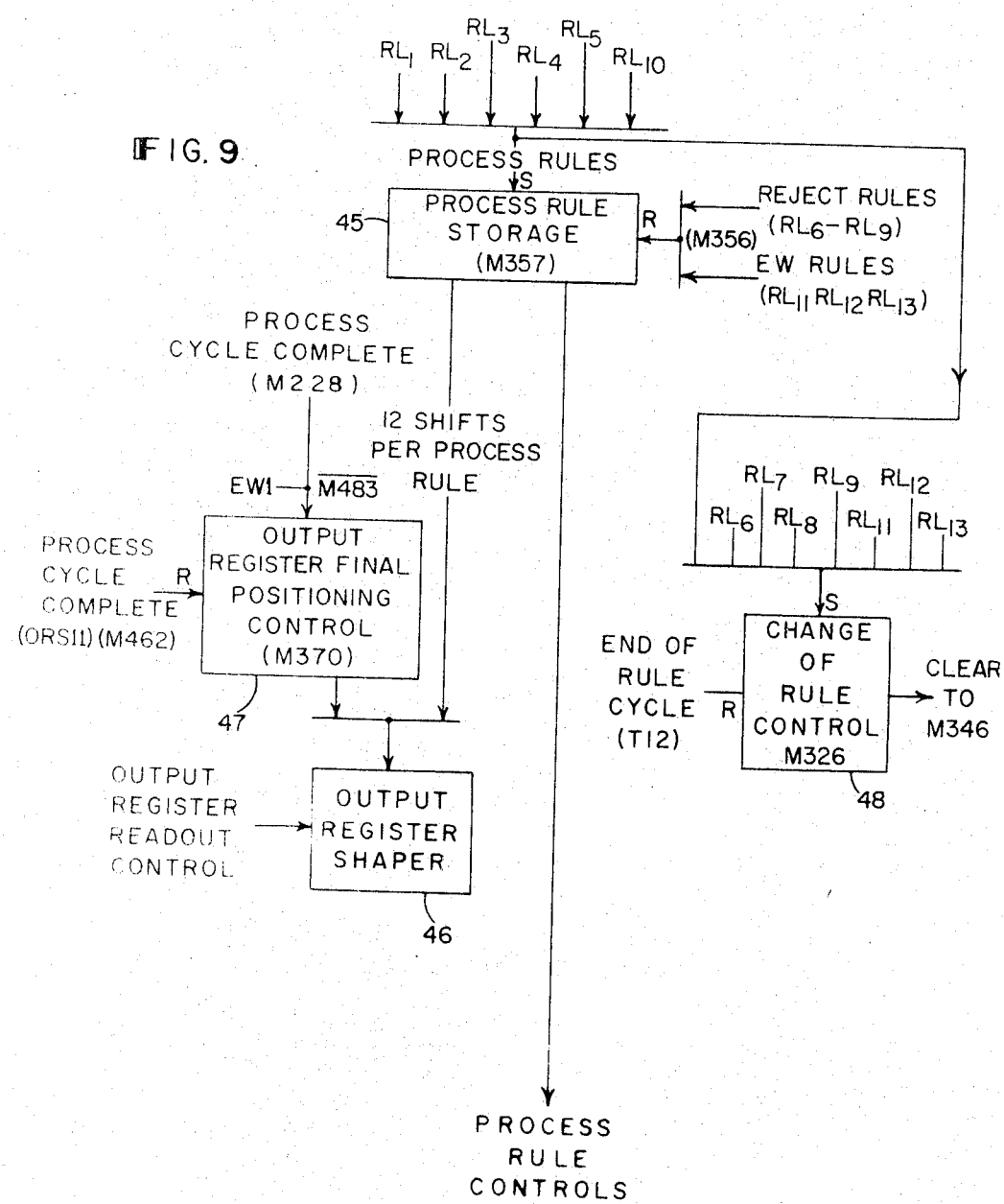
FIGURE 9 shows the diagrammatic representation of the rule distributing circuitry for the output register control.

FIGURE 9 illustrates diagrammatically the basic circuitry utilized in developing the shift signals for the output register of the present apparatus. In this circuitry, it is desired that all process rules produce a selected number of shifts in the output register. Inasmuch as there are twelve positions in the Hollerith code, each processing rule has been arranged so that twelve shifts will take place in the output register. In the present circuit, the rules 1–5 and 10 are process rules and are effective, when present, to set the process rule storage circuit 45. Once set, this process rule storage circuit will supply signals calling for the shifting of the output register with the signals being applied to the output register shaper 46. If there are a series of process rules each occurring in sequence, without interruption, the output register 46 will continue to supply shift pulses to the output register. The process rule storage circuits may be reset by the presence of a reject rule, rule 6, 7, 8, 9 or end of word rule 11, 12 or 13. In other words the shifting normally effected may be stopped by the presence of a reject rule or an end of word rule.

Once the information from the input register has been inserted into the output register, it is desired that this information be moved to a predetermined position in the register prior to the moving of the information out of the output register. For this reason, there is provided an output register final positioning control circuit 47. This circuit is adapted to be set by a "process cycle complete" signal when there is an end of word signal $EW_1$. The final positioning control circuit 47 will be reset as soon as a process cycle complete signal has been received from the output register. In other words, the positioning control circuit 47 will be operative to supply signals to the output register shaper 46 until the information in the output register has been moved to a desired position.

Another function accomplished by the circuitry illustrated in FIGURE 9 is the function for producing an indication of a rule change. For this, there is provided a change of rule control circuit 48 which is adapted to be set whenever any one of the thirteen rules is applied to the input thereof. This circuit will be reset at time T12, which is the end of each rule cycle. The output of the circuit 48 is connected to the inhibit winding on the core M346 of FIGURE 8.

Figure 10:
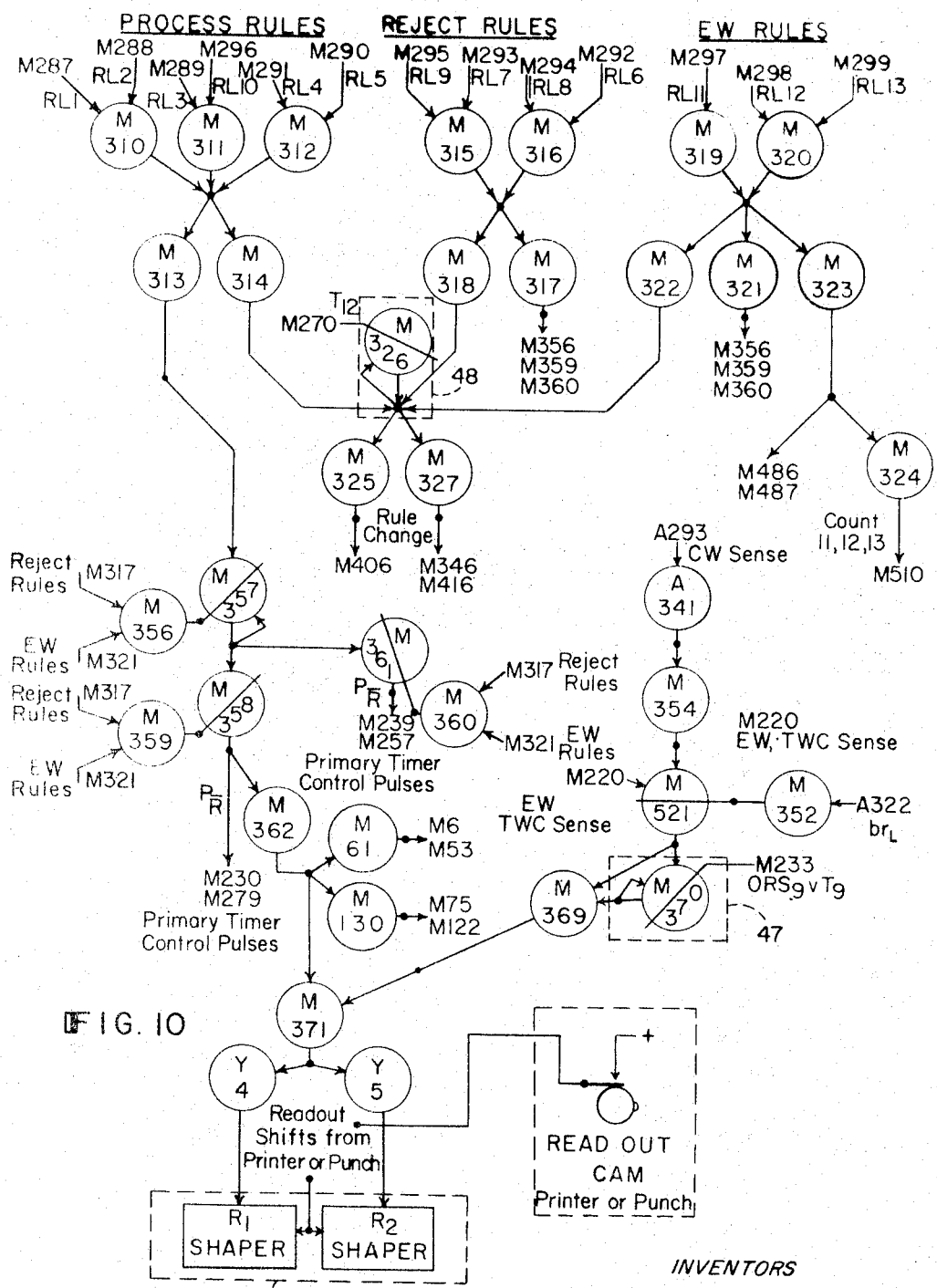
FIGURE 10 illustrates the rule distributing logical detail for the output register control.

FIGURE 10 illustrates the logical detail of the circuitry discussed in conjunction with FIGURE 9. Here, the process rules RL1–RL5 and RL10 are arranged for application to the input cores M310, M311 and M312. The reject rules RL6–RL9 are arranged for application to the cores M315 and M316. The end word rules, rules RL11–RL13 are arranged for application to the input cores M319 and M320.

The process rules will supply signals which will set the magnetic core flip-flop M357. When set, this flip-flop will continue to supply signals through the cores M358, M362, M371 and cores Y4 and Y5 to the $R_1$ and $R_2$ shapers. The shapers $R_1$ and $R_2$ are used for shifting the output register circuitry.

The resetting of the magnetic core flip-flop M357 will be effected by a reject signal or end word signal being applied thereto by way of the cores M317 or M321 to the core M356 and the nto the inhibit winding on the core. The reject rule signal and the end word signal are also applied to the core M359 so that the latter may, when shifted, supply an inhibit signal to the core M358. This latter inhibit winding is provided to cancel the last one that would normally be shifted out of the flip-flop M357 and to insure that only the correct number of shifts are applied to the output register shaper circuit 46. Connected to the process rule storage circuit are a further pair of circuits leading to the primary timer. The shifting through the core M361 is adapted to be inhibited by the reject rule signal or the end word rule signals shifted in by way of core M360. This is comparable to the inhibit signal applied to the core M358.

The output register final positioning control is effected by the magnetic core flip-flop M370; the latter being set by an end word signal $EW_1$ and being reset by a "process cycle complete" signal from the core M233 of the primary timer circuit.

The "change of rule" control circuit 48 is centered about the magnetic core flip-flop M326. This flip-flop is arranged to be set by the occurence of any of the thirteen rules and is further adapted to be reset by a timing pulse T12 from the primary timer of FIGURE 4.

Figure 11:
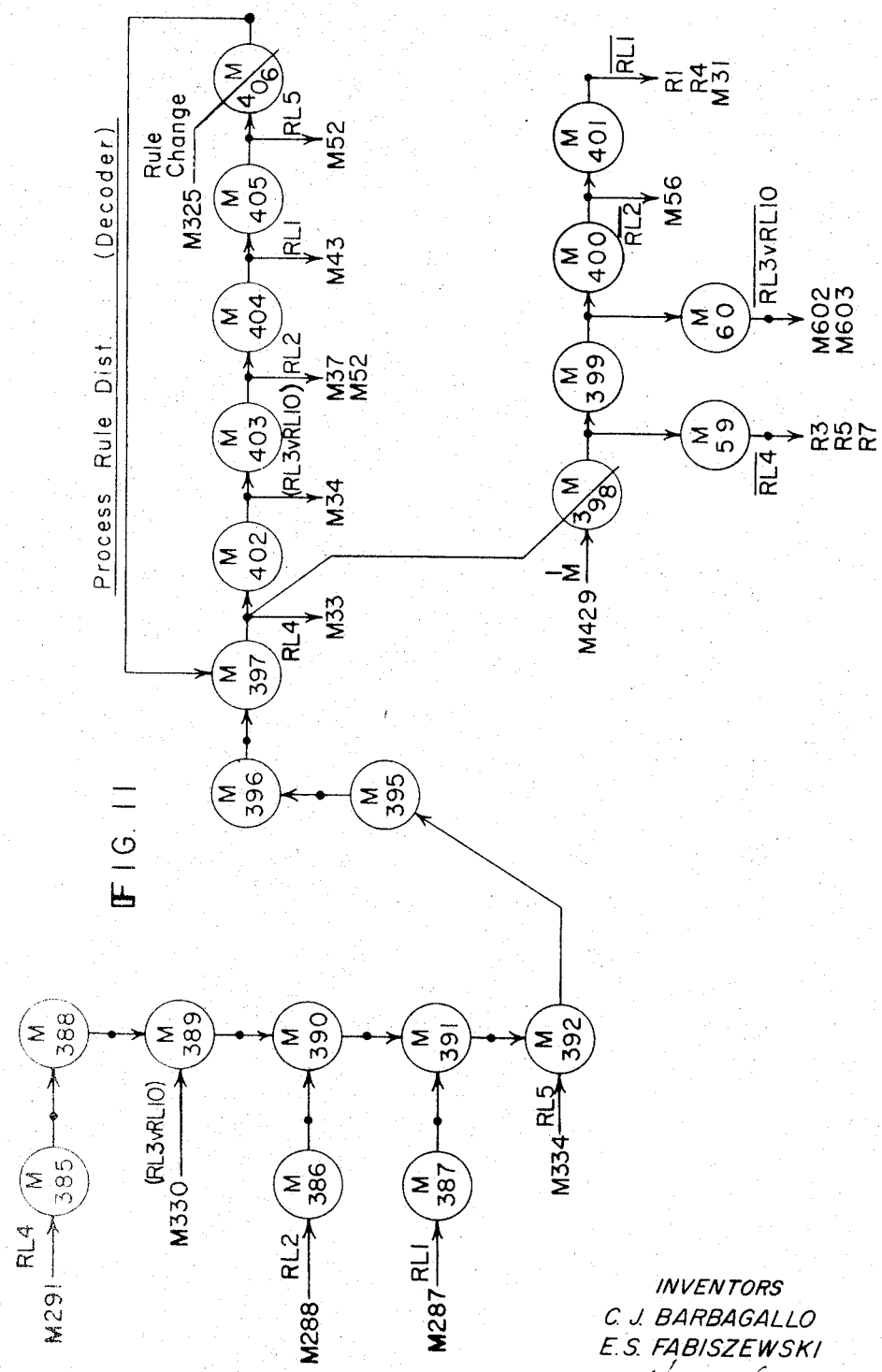
FIGURE 11 shows the process rule distributor for the decoder or converter of the present apparatus.

FIGURE 11 illustrates the process rule distribution circuitry which is adapted to distribute the rules used for the decoding at select times. Thus, the rules RL1–RL5, RL10 are arranged to be read in through the cores M385–M392. As will be apparent from the illustrated core circuitry, the timing of the shifting of these rules through the core M392 and then into the core M395 will be dependent upon the number of cores that the information must pass through. These rules are then inserted into a recirculating ring which includes the cores M397 and cores M402–406. The rules fed out of the core M397 are also applied to an inhibit winding on a core M398 so that with the core M398 having a ones generator connected to the input thereof, the output from the core will be the negation of the rule. These negated rules are arranged for passage through the cores M399, M400 and M401 and the outputs along this core line may be used to supply the respective negated form of the process rules.

Figure 14:
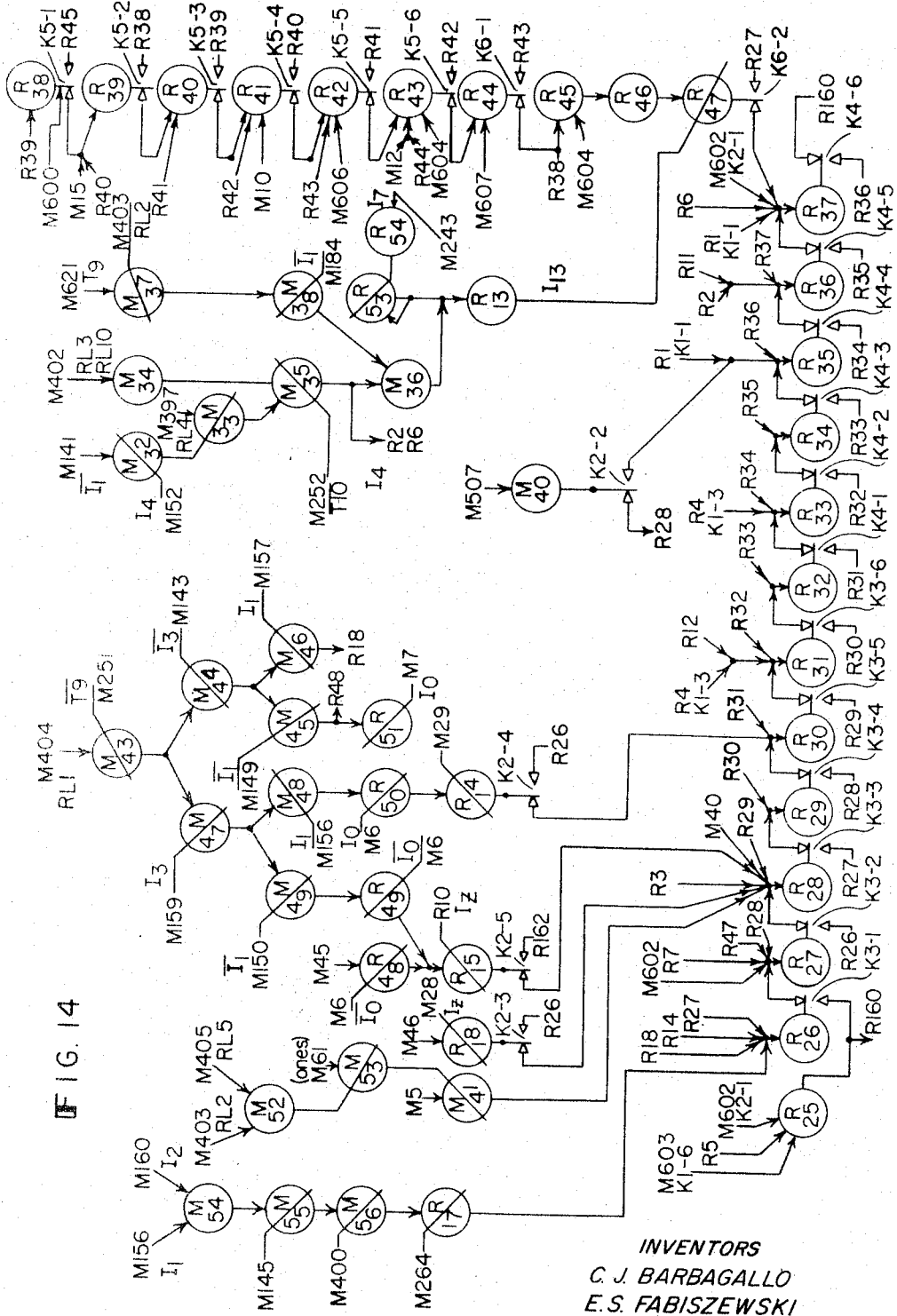
FIGURE 14 illustrates the logical arrangement for the decoder register.

FIGURES 12, 13 and 14 illustrate the circuits utilized in the converting of the information from the input binary coded information to the Hollerith type information.

In order to understand the functioning of the circuitry, the arrangement of the Hollerith code should be considered with respect to the binary coded information. The Hollerith code is generally considered to be a code having twelve positions in a particular column. These twelve positions are referred to as levels. In a tabulating card arranged with the Hollerith code, a single punch or mark in the level 1 position of the particular column will be considered as a decimal 1. A single punch or mark in the level 2 with no other marks or punches in that particular column will designate a decimal 2. In the event that there is an alphabetic code, for example, the letter A will be divided with a punch or mark in the level 1 position and a punch or mark in the level R position.

In order to better understand the conversion operation, the following table illustrates in a series of logical statements the conditions that must exist in order for a signal to be inserted or written into a particular level of any particular column. This table is as follows:

OUTPUT CONVERTER DECODER RULES $I_a = RL_3 v RL_{10} v [RL_4 \cdot (4 v 5)]$ $I_b = (\overline{RL_2} \cdot 3) v RL_3 v RL_{10} v [RL_4 \cdot (4 v 5)]$ $I_z = (1 \cdot 2 \cdot 3) v (\overline{0} \cdot 1 \cdot \overline{2} \cdot 3) v (0 \cdot \overline{1} \cdot 2 \cdot 3)$ $I_0 = \overline{0} \cdot \overline{1} \cdot \overline{2} \cdot \overline{3}$ Level $1 = 0 \cdot \overline{1} \cdot \overline{2} \cdot \overline{3} \cdot I_b$ Level $2 = \overline{0} \cdot 1 \cdot \overline{2} \cdot I_b$ Level $3 = (0 \cdot 1 \cdot \overline{2} \cdot \overline{I_b}) v (0 \cdot 1 \cdot \overline{2} \cdot RL_1)$ Level $4 = (\overline{0} \cdot \overline{1} \cdot 2 \cdot \overline{I_b}) v (\overline{0} \cdot \overline{1} \cdot 2 \cdot RL_1)$ Level $5 = (0 \cdot \bar{1} \cdot 2 \cdot \bar{I}_b)$ Level $6 = \bar{0} \cdot 1 \cdot 2 \cdot \bar{I}_b$ Level $7 = 0 \cdot 1 \cdot 2 \cdot \bar{I}_b$ Level $8 = (0 \cdot 1 \cdot \bar{2} \cdot 3 \cdot RL_1) v (\bar{0} \cdot \bar{1} \cdot 3 \cdot RL_1) v (\bar{0} \cdot \bar{1} \cdot \bar{2} \cdot 3 \cdot \bar{I}_a)$ Level $9 = (0 \cdot \bar{1} \cdot \bar{2} \cdot 3 \cdot \bar{I}_a) v [0 \cdot \bar{1} \cdot 2 \cdot 3 \cdot (RL_3 v RL_{10}) \cdot Printer]$ Level $R = (\bar{5} \cdot 4 \cdot RL_1 \cdot \bar{I}_Z \cdot \bar{I}_0) v (0 \cdot 1 \cdot \bar{2} \cdot \bar{3} \cdot 4 \cdot \bar{5} \cdot RL_4 \cdot Punch)$
$v [0 \cdot \bar{1} \cdot 2 \cdot \bar{3} \cdot (RL_3 v RL_{10} \cdot Sign\ R \cdot Punch]$
$v (5 \cdot 4 \cdot RL_1 \cdot \bar{I}_0)$
$v [0 \cdot \bar{1} \cdot 2 \cdot 3 \cdot (RL_3 v RL_{10}) \cdot Sign\ XR \cdot Punch]$
$v [RL_2 \cdot 3 \cdot (1 v 2)]$ Level $X = (5 \cdot \bar{4} \cdot RL_1 \cdot \bar{I}_Z) v (0 \cdot \bar{1} \cdot \bar{2} \cdot \bar{3} \cdot 4 \cdot \bar{5} \cdot RL_4 \cdot Punch)$
$v [0 \cdot \bar{1} \cdot 2 \cdot \bar{3} \cdot (RL_3 v RL_{10}) \cdot \overline{SIGNR} \cdot Punch]$ Level $O = (5 \cdot 4 \cdot RL_1 \cdot \bar{I}_Z \cdot \bar{I}_0) v [(RL_2 v RL_5 \cdot I_0]$
$v (\bar{4} \cdot \bar{5} \cdot RL_1 \cdot I_0) v (4 \cdot \bar{5} \cdot RL_4 \cdot I_0 \cdot Punch)$ In considering the decoding apparatus more specifically, it should be noted that the decoding is carried out with respect to a selected group of bits from the input register with a single column for the Hollerith code being formed during each processing operation.

The information distribution circuit illustrated in detail in FIGURE 2 is arranged to supply signals to the decoder circuits of FIGURES 12, 13 and 14. These signals are combined with the decoding rules that have been selected so that the information will be inserted into a register location representing particular levels in the Hollerith code in accordance with the original designation of the code in its binary coded form.

More specifically, the circuits of FIGURES 12 and 13 are arranged to have a monitor bit inserted into the cores M1 and M16 respectively at time T7. The ability to write this monitor bit into the cores will be dependent upon whether or not the inhibit lines on these two cores are active or not. If they are active there will be no write-in. It will be noted that the inhibit signal for the core M1 is the information signal $I_1$ from core M158 in FIGURE 2. On the core M16, the negation $\bar{I}_1$ is applied by way of the core M147 of FIGURE 2. The movement of the monitor bit from the core into which it is read will be dependent upon the signals on the inhibit windings associated with the cores from the output. It will be noted that in both FIGURES 12 and 13 that the signals continue to branch out so that it is possible to perform certain logical gating functions in accordance with the information fed in and in accordance with the applied rules.

In considering the movement of the monitor bit through the various paths that are available to it, it should be kept in mind that the information pulses applied to the decoder circuits, and driven from the information distribution circuit, will vary in accordance with the timing of the various signals from the information distribution line. Thus, if the signal $I_1$ at time T7 is not active, the inhibit line on the core M1 of FIGURE 12 will be inactive. However, the inhibit line on the core M16 of FIGURE 13 will be active so that the monitor bit can not be written into the core M16.

The relationship of these timing pulses may be more readily understood by reference to the above table relating the binary values of the bits transferred in from the input register. When a signal is written into the core M1 it will be shifted out at time T8. If there is an $I_1$ signal present at time T8, an inhibit signal will be applied to the inhibit winding of the core M2. However, there will be no inhibit signal applied to the core M11 and this core will have a signal written therein. At time T9 the core M11 will be shifted and will attempt to read into the core M12, M13 and M15. The core into which reading will take place will be dependent upon the presence or absence of signals on the inhibit windings on these cores. If it is assumed that there is an $I_1$ signal at time T9, both the cores M13 and M15 will be inhibited. However, the core M11 will be able to write into the core M12. On the next shift, the core M12 will read out into the core R43 in FIGURE 14.

The monitor bit may also be traced from the core M1 through the core M2 when there is no inhibit signal on the core M2. From the core M2 the monitor bit may be written into one of three cores, M3, M4 and M10, the writing into these latter cores being again controlled by the decoding signal I. The data from the core M3 will be read into the core R1 providing the inhibit line on the core R1 does not have the negation of rule 1 applied thereto. The core M4 has its output coupled to three additional cores, the cores M5, M8 and M9. The writing into these cores will again be determined by the presence of control signals on inhibit lines associated with these cores.

The core M5 has its output coupled to an output core M7 and inhibit line on core M6 and to a further core M41. The output of the core M8 is coupled to the input of a core R2, the latter also having an inhibit line thereon representing the signal $I_A$. The core M9 has an output core R3 connected thereto, the latter core having an inhibit line to which the signal representing the negation of rule 4 is applied.

The core M10 is coupled to the core R4, the latter also having an inhibit line to which is connected a signal representing the negation of rule 1. A switch K1–3 is also coupled to the output of a core R4.

In FIGURE 13 it will be noted that the core M16 has its output applied to two cores M17 and M24. As with the circuitry of FIGURE 12, the monitor bit will pass down the particular signal path which is not cut off or closed by inhibit signals on the cores connected to the output thereof. In FIGURE 13, as in FIGURE 12, the output of the circuitry is all arranged for application to selected ones of the R cores in FIGURE 14.

In FIGURE 14 the cores R25–R47 are basically a storage register to retain the data which is in time-position relation to the Hollerith code. The cores R25–R47 are adapted to be shifted so that the information stored therein will be stored in the equivalent of one column in the Hollerith code in the output register. When the switches K1, K2, K3, K4 and K5 are all in the position shown upon the drawing, the data in the cores R26–R37 will be shifted from left to right out through the switch K4–6 to the core R160 which leads to the output register. In a similar manner the information in the cores R38–R47 will be shifted in a downward direction and out through the core R37 and switch K4–6 to the core R160.

When the output register is being filled for use with a punch on the output, the arrangement of the Hollerith code is reversed from that of the printer operation. Consequently, the switches K1, K2, K3, K4 and K5 are all activated to the position opposite that shown upon the drawing. This will mean that the information in the cores R26–R37 will move from right to left out through the core R160 to the output register. In addition, the information in the cores R38–R44 will be moved in the opposite direction in the cores and will then be read out through the cores R45, R46, R47 and in to the core R27.

The apparent duplication of a portion of the storage circuitry for this decoder is the result of the requirement that additional levels of storage be required in order to perform the number of logical steps. This circuitry may be minimized by applying additional inputs to the cores R26–R37 but at a sacrifice in circuit effectiveness. The operation of this decoding circuitry in the associated register will be more fully described in conjunction with the system operational description.

In addition to the outputs of FIGURES 12 and 13 feeding directly into the cores R25–R45, there are provided additional input circuits which comprise an extension of the decoding circuitry illustrated in FIGURES 12 and 13. Thus, in FIGURE 14, the core chain involving the cores M54, M55, M56, and R17 form an input path for the writing of a signal into the core R26. Similarly, the cores M52, M53 and M41 are used for controlling the writing of signals into the core R28.

Another input circuit for this register of FIGURE 14 is by way of the core M43, the latter having an output feeding a further pair of cores M47 and M44. The core M47 is arranged to feed two additional cores M48 and M49. The output of the core M49 couples with cores R49, R48 and R15 for providing a further write-in signal for the core R28. The core M48 has its output applied by way of cores R50 and R14 through a K2 switch to the core R30. The core M44 has its output applied to cores M45 and M46. The core M45 is in turn used to write into the cores M51 and then core R14. The core M46 is arranged for connection to core R18 and the output of the core R18 is coupled to the input of the core R28.

The cores M32–M38 provide a further circuit for producing the necessary control signals for writing in the output register cores. Associated with these cores is a further core R53 which is adapted to function as a flip-flop having a core R54 connected thereto to inhibit the same under certain input circuit conditions. A core M40 is coupled to the input of the core R35.

Figure 15:
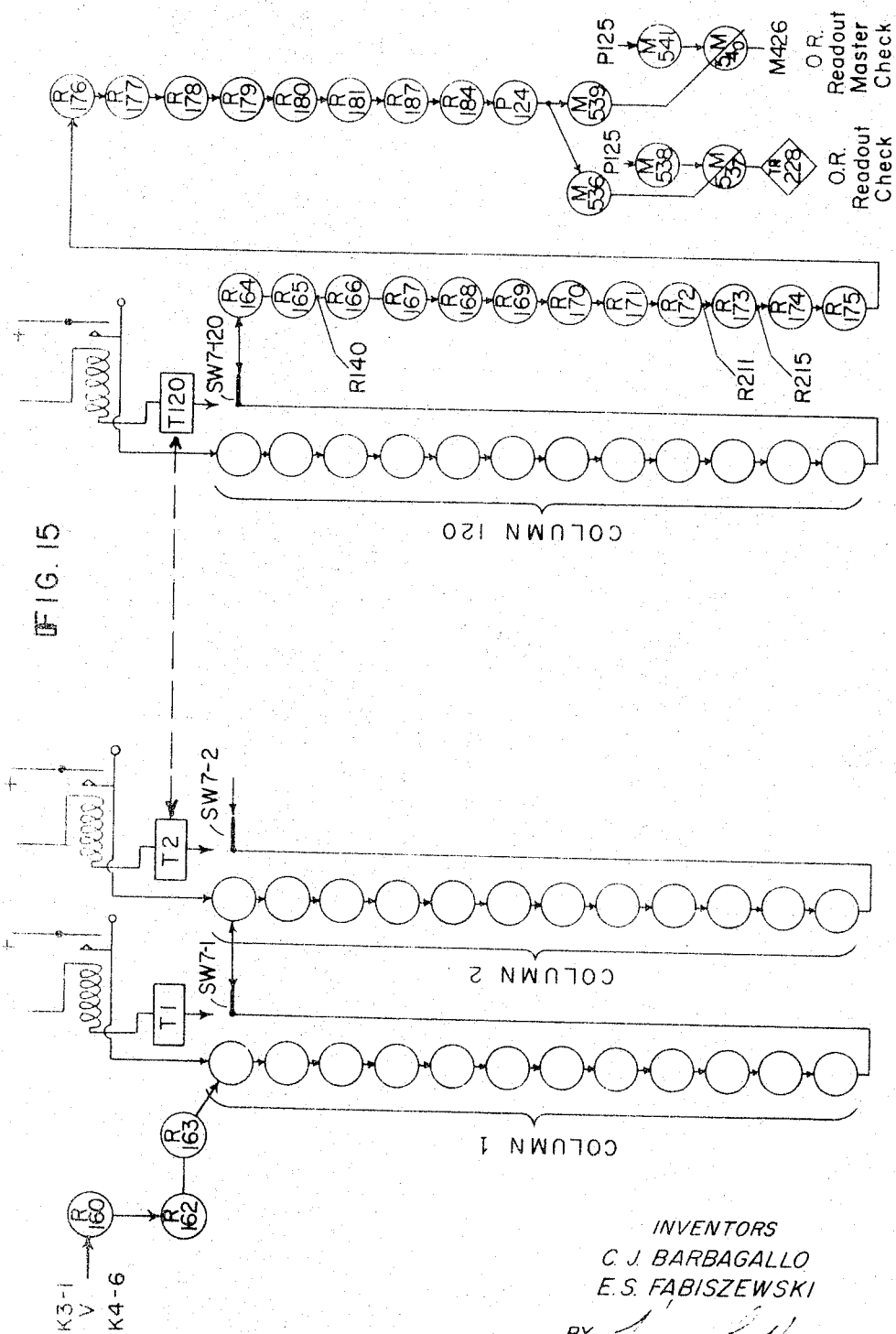
FIGURE 15 illustrates the logical circuitry for the output register of the present invention.

FIGURE 15 illustrates the logical arrangement for the magnetic cores used in the output register of the present apparatus. In one embodiment of the invention, the output register was arranged so that it contained a number of subregisters, each comprising twelve magnetic cores which represent the twelve levels of the Hollerith code in each column.

It will be noted that the input to the output register is by way of the switches K3-1 or K4-6 into the core R160. The core R160 will in turn feed the signals through the core R162 and R163 to the input core in the first column of the output register. Upon the occurrence of the next process rule, the information will then be shifted downwardly and the shifting will continue until the information has been shifted out of the decoder circuitry. The next process rule will be effective to cause the shifting of the information from column 1 serially through the switch SW7-1 into the input core of the next column, column 2. This shifting in of information will continue until all of the information in the output register has been inserted therein, the amount of the latter being determined by the manner in which the apparatus is programmed.

The information, once inserted in the output register will then be moved to the right-hand side of the register so that the information first inserted in column 1 will reside in column 120. The stopping of the shifting in the output register as it is being filled is controlled by a monitor bit which is inserted into the output register and precedes the information by nine pulse periods. This monitor bit will be shifted through the output register as it is serially operated and eventually through the switch SW7-120 to the core line started by core R164. This core then shifts its output into the core R165 and then R166. The monitor bit will be picked off on the output of the core R165 and the output of the core R166 to provide a pair of signals for a one and only one circuit to indicate that the processing has been completed. The effect of the shifting out of this monitor bit will be to stop the clock which is supplying the shift pulses to the output register. This stopping will not be effected until the monitor bit resides in the core R172. The remaining portion of the cores R173–R184 are utilized for shifting the monitor bit into a pair of checking circuits which comprise the cores M536–M541. This checking is arranged so that the monitor bit will come down through the cores M536 and M537 respectively to inhibit the reading in of any signals in the cores M537 or M540 from the respective input cores M538 and M541.

The output register, once shifted into a readout position, will then be switched so that when the readout signals are applied, the information in the register will pass through the switches SW7 into the associated thyratron T1–T120. The firing of these thyratrons will be effective to activate the relays in circuit therewith. When these relays are activated, a circuit is established by way of the relay contacts to an output terminal leading to the utilization apparatus and also to a feed back circuit back to the input core in each of the columns.

When operated for readout, the output register will perform twelve shifts so that all of the information will have passed through the thyratron circuits to an output device and also be recirculated back into the column register for further reference.

If it is desired to repeat the information that is in the register, it is but necessary to once again recirculate the information through the thyratron circuits and the information will be read out to the utilization circuitry.

It will be noted that the operation of the thyratrons and their associated relays will be comparable to the simultaneous serial scanning of each level in all of the columns of the register. This may be considered analogous to the simultaneous serial reading of the levels in the tabulating card. This feature permits the output of the apparatus to be readily adapted for controlling well known tabulating machines which operate with the Hollerith code, whether it be a printer or a duplicating card punch.

Figure 18:
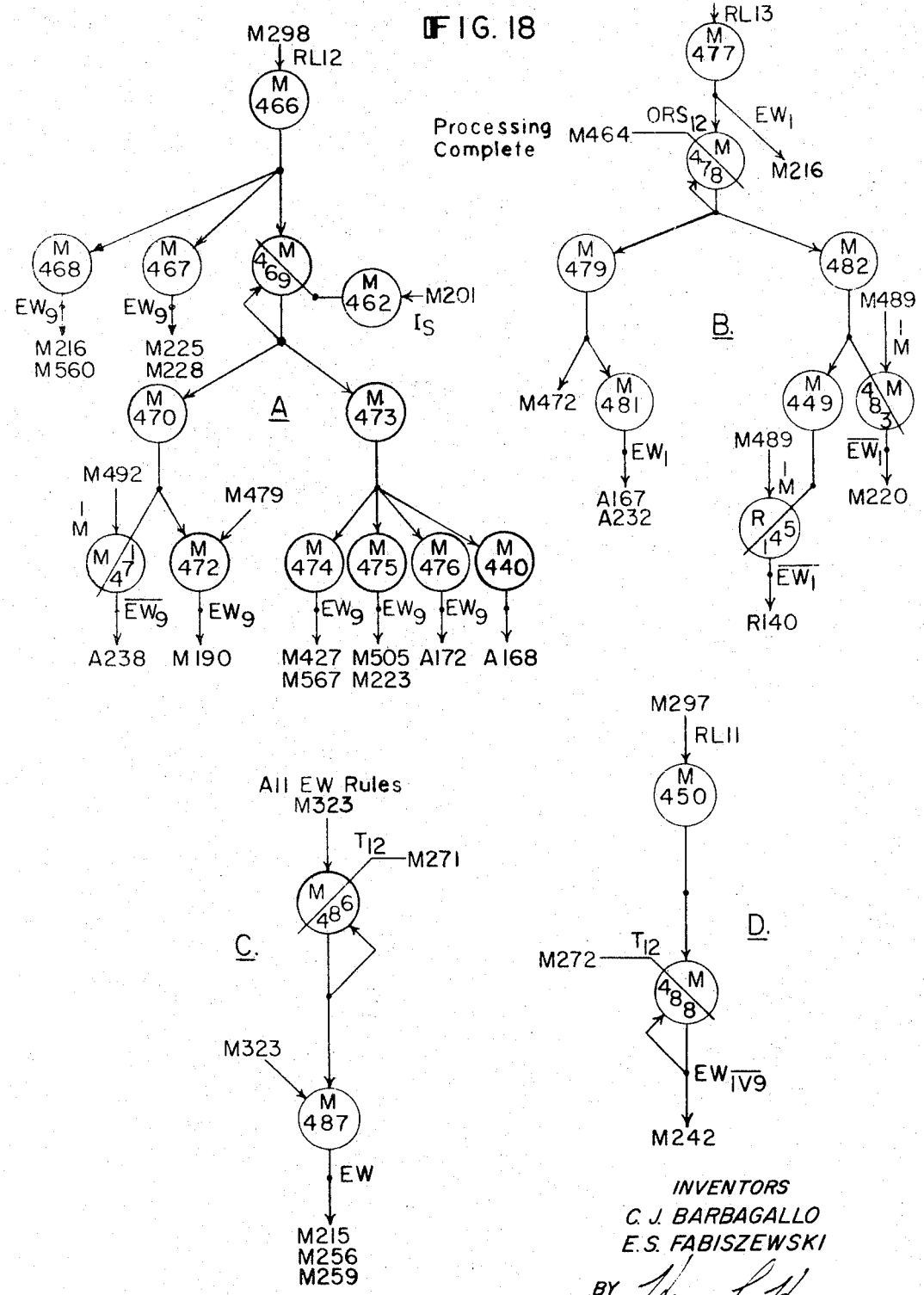
FIGURE 18 illustrates circuit details for the end word rule distributor.

As discussed briefly above, the output register has additional outputs to permit the reading of the information from the register, following a readout so that a check may be made to determine if the readout has been made without error. In other words, after there has been a readout through the thyratron circuits and the next information is ready to be transferred in, it is necessary to move the information in the register out through the register cores. This readout will be effected as new information is being read serially into the input register during the next processing cycle. The information in the output register will then be transferred through its register line R164–R175. The readout from the cores R172 and R173 will be utilized in an appropriate counter circuit such as illustrated in FIGURE 18 which produces the desired count of the number of signals transferred out from the output register.

Figure 16:
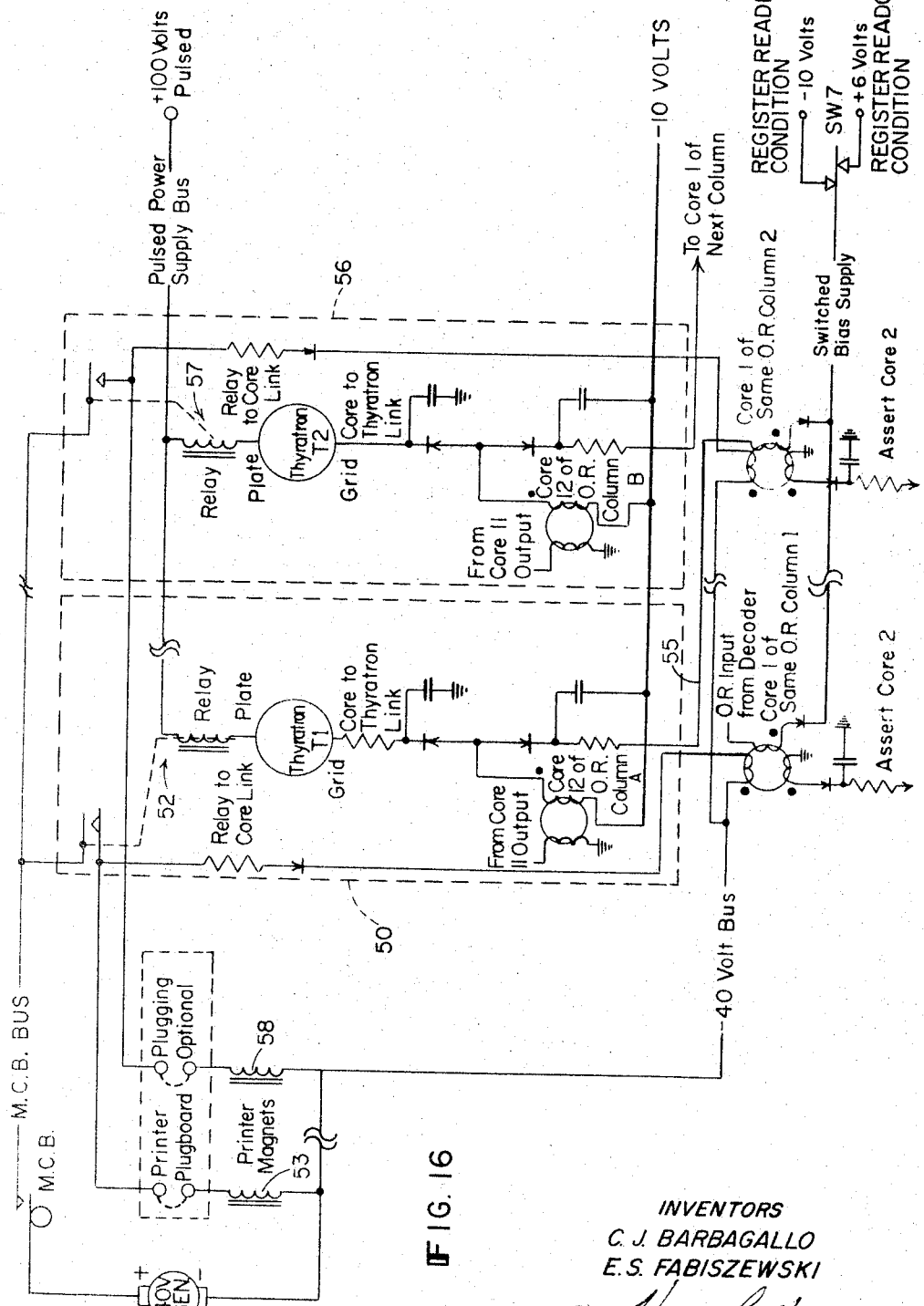
FIGURE 16 illustrates circuit details associated with the readout circuits of FIGURE 15.

FIGURE 16 illustrates in greater detail the output register circuit details in the area of the core circuitry feeding the thyratrons and further the reading back into the input core. In this figure, the numeral 50 refers to the thyratron-relay circuit for the first column in the output register. The input core for the circuitry of FIGURE 16 is the core 1 of the first column which may be connected to the output of the decoder. The setting of this core 1 will result in a subsequent shift pulses causing the information therein to be shifted into the next core in the series. The shifting of the information will continue until the output from the core 11 in the column is read into core 12 shown within the designated area 50. The core 12 is the output core for the circuit. When the core is shifted, the output is adapted to be applied either to the input of the thyratron T1 or into the first core of the next adjacent column, column 2. If the core 12 of column 1 is read into the thyratron circuit T1, the thyratron will fire when the voltage supply is present on the plate circuit so that the relay 52 will be energized. The energization of the relay 52 will close the associated relay contact and complete a circuit to the printer magnet 53 by way of a suitable printer plugboard if such is desired. In addition, the closing of the relay contact of the relay 50 will complete a circuit and relay a core link which will effect the writing of the information from core 12 back into the core 1. This subsequent shifting of the cores will move the information down through the other cores of the column register so that upon the completion of the readout of the column register, the circuit will be back in the state of energization just prior to the readout.

In order to prevent the reading of the information on the core 12 into the next column, the cores in each of the columns are biased so that a readin cannot be effected. This bias is produced by the switch SW7 which when active will apply a six volt biasing signal to the windings on the right hand side of each of the cores illustrated. Thus when the core 12 of column 1 is shifted, the readout pulse will be insufficient to overcome the fixed bias on the winding on the first core of the next adjacent column. The circuit before this readout is by way of lead 55.

In a similar manner, the readout from the second column illustrated will be effected by the readout circuitry in the enclosure 56. Here the shifting of core 12 will be effective to fire the thyratron T2 if there was a signal in the core 12. The firing of the thyratron T2 will energize the output relay 57 to effect a closing of the associated relay contact. This will complete an energizing circuit to the related column printer magnet 58 by way of the printer plugboard.

On a readin to the output register, the switch SW7 will be switched to the opposite position wherein a —10 v. bias will be applied to the readin windings on the first cores of each of the columns. Thus, the information coming in through the core 1 of the first column may be shifted therethrough and then into core 1 of the second column and thence into the rest of the cores of the output register.

Figure 17:
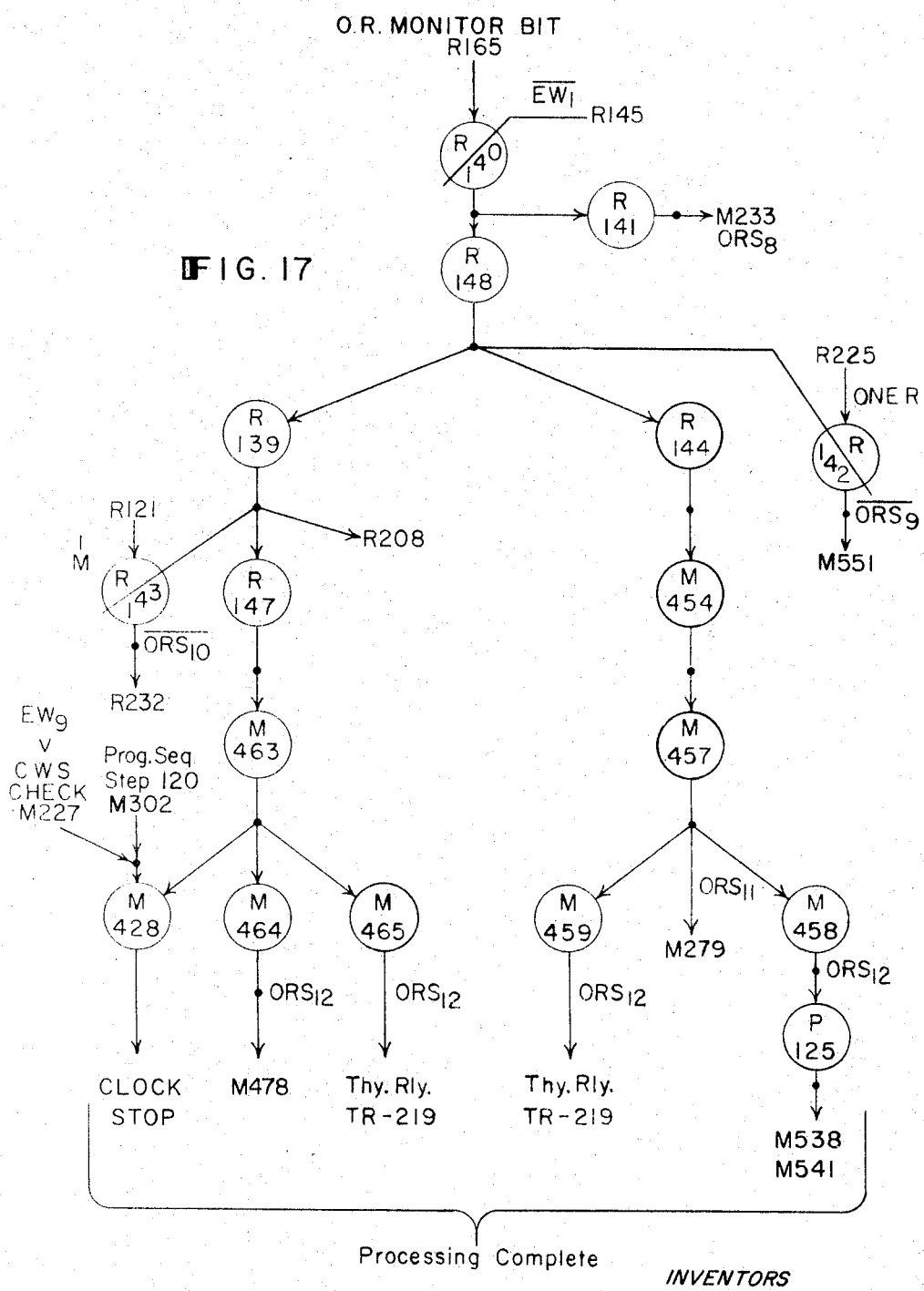
FIGURE 17 illustrates a portion of the checking circuitry for the checking of the operation in the output register.

In FIGURE 17, the circuitry for the sensing and utilizing of the output register monitor bit is illustrated. In this circuit, the monitor bit is adapted to be inserted into the core R140 and then will be shifted into the core R141 and R148. The monitor bit in the core R141 when shifted will produce an output $ORS_8$ for use in the core M233 of FIGURE 4.

In order to prevent the read-in into the core R140 when the apparatus is not in an end word state, the signals $\overline{EW_1}$ are applied to the inhibit windings on the core R140. This is useful in preventing the passage of unwanted information from the output register into the control circuitry.

The monitor bit is adapted to be shifted down out of the core R148 to the cores R139 and R144. The signal will then be shifted on down through the respective core lines to produce output control functions useful in the control of the apparatus. Thus, when the signal in the core R139 is shifted down through R147, and M463 into the core M428, the core M428 will be stored so that upon a shift of the M cores, the clock supplying the timing pulses to the circuit will be stopped. The insertion of the monitor bit in each of the cores M465, M459, M458 provides storage for indicating that the processing cycle is complete.

In order to produce the negation of this monitor bit signal, the monitor bit is applied to both the cores R142 and R143, the latter having a ones generator on the inputs thereof. The effect of this is to produce in the output of the core R142 the signal $\overline{ORS_9}$. One pulse period later the output of the core R143 will be $\overline{ORS_{10}}$. These latter two signals are used in the output register check circuit of FIGURE 19.

FIGURE 18 illustrates the logical circuitry for distributing the end word rules RL11, RL12 and RL13.

FIGURE 18A illustrates the circuit for distributing rule 12 which is the end word 9 rule. Here, the rule signal will be written into the core M466 and thence into the cores M468, M467 and M469. The reading into the core M469 will set this core so that it will act as a flip-flop upon subsequent shift pulses until such time as the initial set pulse IS is applied to the inhibit winding by way of core M462. The core M469, when set, will produce a series of ones which will be applied to each of the cores M470 and M473. The cores M470, M473 are connected to the output cores M472, M474, M475, M476 and M440. These output cores will supply a chain of ones so long as the end word 9 rule flop M169 is set. This negation of this $EW_9$ signal will be provided on the output of the core M471, the latter having a ones generator connected to the assertive input thereof and the core M470 connected to the inhibit input thereof.

FIGURE 18B illustrates the distribution circuits for rule 13. Here, the readin of the rule 13 to the core M477 will be effective to set the core M478 so that this core will act as a flip-flop which produces a series of ones indicating the presence of rule 13 or end word 1. These signals are in turn propagated down through the associated cores M479, M481, M482, M449, M483 and R145 in a manner similar to that of FIGURE 18A to produce the assertive and negative forms of signal $EW_1$.

FIGURE 18C illustrates the circuitry for utilization with all of the end word rules and this circuit comprises a magnetic core flip-flop M486 which is adapted to be set by the presence of a signal from any one of the end word rule cores. This will produce a series of output signals EW on the output of the core M487 until the flop is reset at time T12.

FIGURE 18D illustrates the circuitry for distributing the end word rule RL11. Again a magnetic core flip-flop is used and includes a core M488. This will produce in the output a series of signals $\overline{EW_{1v9}}$ until the flip-flop is reset at time T12.

Figure 19:
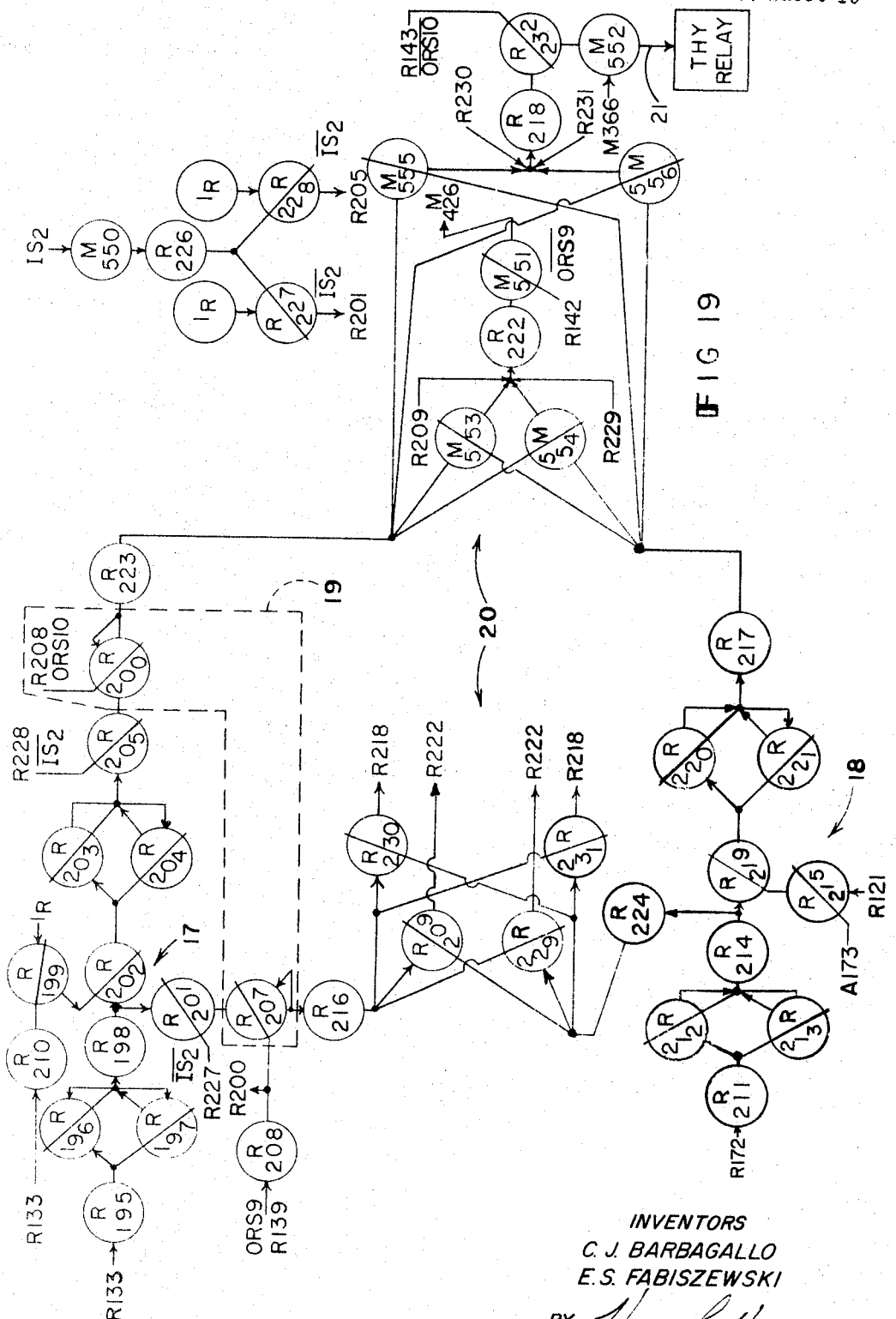
FIGURE 19 illustrates further circuitry used in the checking circuits of the apparatus.

FIGURE 19 illustrates the logical circuitry used for checking the output register. This circuit comprises a pair of counters which are adapted to count the number of bits inserted into the output register during the process cycle and to count the number of bits shifted through the output register to the checking circuit during the next subsequent process cycle to determine if the number of bits entered and removed from the register correspond. It will be noted in FIGURE 1 that there is both a decoder 12 and a decoder check circuit 13. The counter used in the present circuit for checking the number of signals inserted into the output register is counted in the output of the decoder check circuit 13. Since the decoder check circuit should perform in the same manner as the decoder, if the circuit is operating properly, the connection of the counter 17 to the decoder check circuit 13 will amount to counting the same signals going into the output processor. Considering FIGURE 19 more specifically, the counter 17 is a magnetic core type counter employing two stages and operating modulo 4. The input from the decoder check circuit 13 is by way of code line R133 which corresponds to a core on the output circuit of the decoder 12.

The first or low order stage of the counter 17 is comprised of the cores R196 and R197. The high order stage of the counter is formed by the cores R203 and R204. The first signal in from the core R133 will be effective to store a one in the first stage with the core R197 being set. The second signal in from the line R133 will be effective to reset the first stage and to provide a signal by way of core R210 which supplies an inhibit signal to the core R199, the latter having a ones generator connected to the input thereof. The inhibiting of the core R199 will prevent this core from applying an inhibit signal to the core R202 and consequently a signal will be shifted into the core R202 onto the core R203 to set the second stage of the counter. The subsequent signal on the input line R133 will again set the first stage to a 1. The fourth input signal on the line R133 will be effective to reset both the first and the second stages.

After the counter has made its modulo 4 count of the information coming out of the decoder check circuit 13, the first low order stage of the counter will be examined by way of core R201 and will be effective to set the flop R207 if there is a signal stored in the first or low order stage. The second or high order stage will be examined at a corresponding time by way of the core R205 which is momentarily gated upon by the signal $\overline{IS_2}$. The presence of a signal in the second stage will set the storage core R200. Thus, the storage circuit 19 is comprised of two magnetic core flip-flops which are adapted to be set in accordance with the information supplied by the counter 17.

While new information is being read into the output register and the counter 17 is counting this new information, the old information in the output register will be counted in the counter 18 which is comprised of the same basic modulo 4 counter as the counter 17. The outputs from the storage circuit 19 and the counter 18 are compared in the check circuit 20 which comprises a "exclusive or" circuitry means. This "exclusive or" circuitry is so arranged that if a signal should appear on one terminal at a time it does not appear on the other input terminal, an output signal will appear indicating the detection of an error. Inasmuch as the storage circuit will be producing a series of ones if the respective stages thereof are set, this will result in a series of ones being applied to the upper terminals of the "exclusive or" circuit. These ones may not be cancelled out by signals from the counter 18. Consequently, the "exclusive or" circuit is examined at one particular instant which is controlled by the gating on the cores M551 and R232. The "exclusive or" circuits may be duplicated for checking purposes. This gating will occur at a particular time which is determined by the movement of the monitor bit through the circuitry of FIGURE 17.

The output of check circuit 20 will be by way of output lead 21 and this lead is shown connected to a suitable thyratron circuit for indicating a failure of the circuit to perform in the manner desired.

Also illustrated in FIGURE 19 is the circuitry for producing the negation of the initial set signal $IS_2$. This negation form of the signal is produced by using the signal $IS_2$ on the inhibit lines of the cores R227 and R228 to prevent the writing of ones into these cores from the ones generator connected thereto.

FIGURE 20 illustrates diagrammatically the timing clock for the present apparatus in block 60. This timing clock will supply a series of timing pulses which are used for correlating the functional operation of the apparatus. Connected to the output of the clock 60 is a clock gate 61 which has as one input a start signal which is activated when it is desired to start the decoding operation. The clock gate is adapted to be closed or stopped by a signal $ORS_{12}$ indicating that the process cycle has been completed. The output of the clock gate 61 connects to a Y shaper 62 which functions as a time synchronizer for all the shapers used in the circuitry of the whole system. For example, the Y ones generator 63 is shown supplying timing signals to the M shaper 64. The M shaper 64 supplies shift pulses to all of the M cores in the circuitry.

SYSTEM OPERATION

In considering the over-all system operation, reference is made first to FIGURE 1. In this figure, in the data source for the conversion operation is adapted to supply data into the input register 10. The manner in which this reading in of information is accomplished is described more fully in conjunction with the above mentioned copending application of Charles J. Barbagallo, et al. The information from the input register, when it is desired to process the same, is transferred into and through the information distribution circuitry. The transfer in the presently described apparatus is a serial transfer. The information is passed from the outputs of the information distribution circuitry 11 to a decoder 12 and a decoder check circuit 13. The decoder 12 is adapted to rearrange the information from the binary code into the Hollerith code for insertion into the output register 13. The decoding check circuit is in effect a duplicate of the decoder 12 and consequently the signals coming out of the check circuit 13 should correspond to those from the decoder 12. As long as the outputs are the same, the check circuit 14 will produce no output error signal. The check circuit 14 is operating on a bit by bit or signal by signal basis.

As information is read out of the decoder check circuit 13, the signals in the decoder output will be counted by the counter 17 and these signals will be stored in the storage circuit 19. The decoder information is read out of the output register, as the new information is being read into the output register, and the counter 18 counts the number of signals that have been manipulated in the output register. The resultant count from the counter 18 is compared with the count from the storage circuit 19 in the comparison check circuit 20.

The description that follows is a more detailed analysis of the logical flow of signals through the conversion apparatus.

During the readin into the input register, as described in the aforementioned co-pending Barbagallo et al. application, a lead sentinel preceeds the information and is used to condition certain circuits for the processing operation. Thus, the lead sentinel is adapted to be inserted into the cores M206, M200 and M201 in the circuitry of FIGURE 2A. The write-in of the lead sentinel is by way of the core A182 the latter having an inhibit winding activated as soon as the ones generator 1M supplies signals therethrough to prevent the write-in of additional information into the core A182. This takes place after the lead sentinel has set the M output cores in FIGURE 2A so that the information is shifted out of the input register. No further signals will pass into the cores M201, M200 and M206. The signal from a core A2 in the input register will block the pulse immediately following the lead sentinel in the core A180 and is used because of the time requested to activate the inhibit on cores A181 and A182.

The lead sentinel is also used to set the input register shift control circuit 41 in FIGURE 8. This is accomplished by way of an initial set signal being written into the core A340 and then being shifted into the cores M348, M350 and M353. These M cores will store the signal until the M shaper is activated.

At the start of the processing operation, a start clock signal or a start decode signal will open the clock gate 61 in FIGURE 20. The clock signals will pass through to the Y shapers 62 and then to the M shaper 64.

The activation of the M shaper will result in shift signals being applied to all of the M cores as the clock pulses arrive. The shifting of the core M201 in FIGURE 2A will result in the initial set signal $IS_1$ being inserted into the primary timer set core M237 in FIGURE 4. Further, with the energization of the M shaper, the cores M348, M350 and M353 of FIGURE 8 will begin shifting to supply with shift signals to the shapers A, B, C, and D, the latter all being associated with the shift circuits of the input register 10.

The $IS_1$ signal from the core M200 in FIGURE 2A is shifted into the core M427 to set the circuits for the forming of the $IS_2$ signal when the core M427 is shifted. Core M206 is shifted into the core M505 to set up a further source for an $IS_2$ signal.

The next shift caused by the M shaper shifts the $IS_2$ signal from the core M427 at FIGURE 2A into the core P4 as the monitor bit for the program sequencer in FIGURE 6.

The following shift results in the core M507 in FIGURE 2A shifting to insert a monitor bit into the core M40 in the decoder circuit of FIGURE 14. This monitor bit will be shifted into core R28 if the switch K2—2 is in the position shown upon the drawing which is for printer operation on the output. If the switch K2–2 is switched to its opposite position, the core M40 will be read into the core R35 for punch operation. The monitor bits inserted into the decoder are arranged to lead in time the decoded information from the first processing rule by nine pulse periods. This monitor bit is timed to lag the previously decoded information by fourteen pulse periods.

The $IS_2$ signal is also used in the output register decoder check circuit of FIGURE 19 to open the gates for setting the storage circuit 19. This signal is effective in its negative form only after the first information has been moved into the output register in the first processing cycle.

While the IS signals are being distributed, the information in the input register is continuing to shift and a total of eleven shifts will take place under the control of the input register shift control circuit of FIGURE 8 which was set in the manner above described. These eleven shifts are used to position the information preparatory to its insertion into the decoding circuits.

At time T5, as established by the primary timer of FIGURE 4, the monitor bit signal will be shifted out of the core M280 to supply a control signal to the P shaper 27. This will cause the P shaper to shift the monitor bit in the program sequence register of FIGURES 5 and 6 for step 1. This will mean that the core P4 of FIGURE 6 will have the signal shifted therefrom out to the step 1 terminal and this step 1 terminal will be plugged by the way of the program plugboard to one of the thirteen rule terminals on the plugboard. For purposes of the description that follows, the first rule selected is assumed to be rule 1 which is a six bit alphabetic rule. Since it is a six bit alphabetic rule, this rule will be effective to cause the shifting of six informational bits from the input register. The timing for this six bit shift will be controlled by the insertion of a T1 timing signal into the core M345 in FIGURE 8. Prior to this T1 timing signal in the core M345, a start of rule signal will be applied at time T10 to the core M349. The core M349 will maintain the flip-flop core M348 in the set state so that the circuit will continue to supply shift signals to the input register shapers A, B, C, and D. The timing signal T1 will be shifted through the cores M345, M346 and M347 to inhibit the core M348. This will cut off the flip-flop M348 and therefore no further shift signals will be supplied to the cores M350 and M353 and subsequent cores leading to the input register shapers. The total number of shifts made by the pulses produced by the shapers will be, under the operation described, eleven shifts for the initial shift and then six shifts for the readin of information to the decoder.

Another function performed during the set-up for the processing of the first rule is the insertion of the new rule into the process rule distribution ring of FIGURE 11. Since rule RL1 has been selected as the first rule, this rule signal will be shifted out of the core M387 and by way of cores M391 and M392 into the core M395 so that the core M395 will be set with rule RL1 at time T10.

At time T1, the new rule process cycle begins. This means that the information from the input register will begin coming into the information distribution circuit 11 with the low order bit which is $2^0$ coming in at time T1 on the core M140 of FIGURE 2. As indicated in Table 1 above, the information signal for $I_1$ will take six pulse periods of time before it will appear on the output of the distribution circuit. When it does not appear on the output of the information distribution circuit, the output will be available for use in the decoder circuitry of FIGURES 12, 13 and 14.

By way of example, it is assumed that the first six bits of information are representative of a binary coded 5. This means there will be a signal representing a $2^0$ bit and a signal representing a $2^2$ bit.

At time T7, a monitor bit from the primary timer core M240 is applied to the inputs of the decoder cores M1 and M16. Under the assumed conditions, the presence of a $2^0$ bit at time T7 will result in an inhibit signal being applied to the core M1, a zero being applied to the inhibit line on the core M16. Consequently, the monitor bit will be written into the core M16 and in core M1.

At time T8, the core M16 will write into the core M17 as soon as $I_1$ at time T8 will be a zero. At time T9, the signal $I_1$ will be $2^2$ and $\bar{I}_1$ will be zero so that it is possible to read into the core M21. At time T10, the core M21 reads into the core M601. At time T11, the core M601 will read into the core R43 in FIGURE 14. In noting FIGURE 14, the core R43 is a part of the decoder output register circuit and represents level 5 in the Hollerith code. At time T12, the signal in the core R43 will be read into the core R44. Thus at the end of the process rule cycle, a signal will reside in the core R44 and this signal will be representative of a signal at level 5 in the Hollerith code.

With the starting of the next following process rule cycle, the output register will be shifted and consequently the R cores in the decoder circuit of FIGURE 14 will also be shifting. The signal in the core R44 will be shifted through the cores R45, R46, R47 and R37 so that at time T5 of the next process rule cycle, the signal will appear on the output of the core R37 and will be written into the core R160 of the output register of FIGURE 15.

In the foregoing discussion, the processing cycle has been considered with respect to the processing of a single rule where only six bits were involved in the transfer from the input register. The processing was initiated at time T5, eight pulse periods before the main timing cycle T1–T12 begins. This initial time is used as set-up time where the information is being positioned for removal from the input register. During the timing cycle T1–T12, the data was decoded and will at the end of this cycle reside in the output cores of the decoder circuitry. During the timing cycle immediately following the processing cycle, the information in the decoder register is shifted out into the output register and this shifting out requires another twelve pulse periods. Thus, a total of thirty-two pulse periods are required in order to set up for the processing and movement of information out of the input register to the output register.

To better utilize the circuitry, the circuitry has been arranged so that there is an overlapping of functions. Thus, after the first set-up operation of the apparatus, there are three major functions being performed during each twelve pulse period timing cycle. First, the information in the decoder is read out to the output register; secondly the information is decoded in the decoder; and thirdly the rule to be performed in the following timing cycle is set up.

To illustrate this further, the next operation to be performed is assumed to be a process rule RL2 which is derived by way of the program plugboard of FIGURE 6. Rule RL2 is a four bit hexadecimal rule. During the timing cycle when the first rule is being performed in the decoder, a timing signal at time T5 will cause the P shaper of FIGURE 4 to shift the program sequencer 30 of FIGURE 6. Thus, the program sequence bit stored in the core P5 will be shifted out and read into the next core in the series. The signal output from the core P5 will appear upon the step 2 terminal and is here assumed to be plugged to the rule 2 input terminal. With rule 2 selected, the core M288 will be set and upon the next shift of the M shaper, the core M288 will read out into the associated circuitry.

The rule 2 signal from the core M288 will be read into the core M329 in FIGURE 8 to set the input register control circuit for a four bit shift from the input register. This will result in the core M339 being set at time T12. The start of rule signal will be applied to the core M349 at time T10 to thereby set the input register shift control circuit for the next input shift which will start at time T1 of the next processing timing cycle.

The RL2 signal will also be written into the process rule distribution circuit of FIGURE 11 so that it will appear at the core M395 at time T10 prior to the insertion of the signal into the rule distribution ring. The RL2 signal will also be written into the core M310 in FIGURE 10 to set the rule change circuit 48 which includes the core M326. The rule change signal from the core M326 will be effective to inhibit the circulation of information in the storage ring of FIGURE 8 by inhibiting the write-in of information to the core M346. The rule change will also be effective to clear the rule distribution ring in FIGURE 11 by applying an inhibit signal to the core M406.

At time T1 the circuits will be conditioned to perform the next processing cycle. The input register will start shifting and will shift four bits into the information distribution circuit of FIGURE 2. It is assumed here that the next four bits are a binary coded decimal 8 or 1000. Thus, the only bit which will be a 1 on an input transfer from the input register will be a $2^3$ bit.

At time T7 the decoder monitor bit will be applied to cores on the input of the decoder circuits of FIGURE 12 and FIGURE 13. The signal $I_1$ at time T7 will be zero as shown in Table 1 supra. At time T8, core M2 will have the monitor bit inserted therein for the reason that at time T8, $I_1$ will still be zero. At time T9, core M4 will have the monitor bit inserted therein since $I_1$ at time T9 will be a zero. At time T10, core M8 will be written into since $\overline{I_1}$ will not be present due to the presence of the $2^3$ bit of information. At time T11 the monitor bit will be read into the core R2 since the $I_A$ signal from the core M35 in FIGURE 14 is not present. At time T12, the core R2 will feed a signal into the core R36 in the output core line of the decoder in FIGURE 14. This will be level 8 in the output. Thus when the decoder is read out into the output register on the next processing cycle there will be a signal in level 8 in the next column formed in the output register.

The next rule discussed is a repeat rule. That is, the third step in the program is assumed to be plugged so that the rule just performed will be repeated. This is accomplished by connecting the third step output terminal on the plugboard from the program sequencer of FIGURE 6 to the repeat rule terminal on the plugboard. Thus, when the program sequence shift signal is applied to the P cores on FIGURE 6, at time T5 of the previous timing cycle, the rule signal will be read out of core P6 into core P7. Since the repeat rule terminals serve as terminating points for the circuit of the program sequence signal, no signal will be read into any of the output rule cores M287-M299.

Since there is no rule signal fed from the rule generating cores of FIGURE 6, the generating of rule circuit 48 of FIGURE 10 will not be set after it has been reset at time T12. Thus the process rule distribution circuit of FIGURE 11 will continue to circulate the last rule in the distribution ring. Similarly the input register shift control circuit of FIGURE 8 will continue to circulate the last rule in the circulating ring of cores M341-M346. Thus when the core M349 is set at time T10, and subsequently starts the input register shift, the input register will have its shapers A, B, C, and D shifted until the rule circulating in the storage ring feeds out to reset the core M348. Thus, if the previous rule was a four bit rule, four shifts will be made in the input ring to the input distribution circuit. The rule will then be performed as the previous rule was performed.

The rule selected for repeating may be repeated as many times as desired by suitably plugging the plugboard to the repeat rule circuit. It will be apparent that the only rule which can be repeated will be the rule just previously performed. Thus if there has been a six bit rule, a four bit rule, and then a six bit rule, in order to repeat a four bit rule following the six bit rule, the four bit rule must be plugged as an active rule and then it may be repeated as many times as desired.

This repeating may be applied to any of the rules of the apparatus but the repeating is not used by an operator on the end word rules.

The reject rules of the present apparatus are provided to enable a programmer to read information from an input register without processing it at the output. This facility permits a programmer to edit selected portions of the information stored in the input register. For example, if the information in the input register represented a customer account number, customer name, address, and the balance of an accounts receivable account, it would be possible to edit out all items except the account number and the amount of the accounts receivable account.

The reject rules are selected on the program plugboard in FIGURE 6 in the manner in which the other rules are selected. However, the timing associated with the reject rules has been modified so as to speed up the overall processing time. The modification has involved a shortening of the over-all timing cycle from twelve pulse periods for the normal process cycle to six pulse periods for the reject cycle.

As viewed in FIGURE 3 at the end of the timing cycle at T12 an end rule signal is available to set the primary timer for the next function. When the next rule to be performed is a reject rule, as defined by the presence of the signals for no processing and no end of word, the end rule signal will be written into the T7 stage of the primary timer. Thus the reject functioning is carried out during the pulse periods T7 through T12.

Considering the timing more specifically, during the previous processing rule at time T5, a new rule which is here assumed to be a reject rule is selected. The selecting of the reject rule sets the circuits so that as the primary timer continues to operate it will produce a signal at time T11 which will cause a full shift of the program sequence register so that the rule following the reject rule will be selected. This is, from the timing standpoint, the same as a T5 signal in a normal processing rule. In other words, when the rule following the reject rule is called out at time T11, the timer will continue to operate and step from the position T12 to T7 for the performance of the reject rule. By the time that T12 has been rejected in the performance of the reject rule cycle, the other circuits will have been conditioned so that the rule following the reject rule will be set up for performance.

During the performance of the reject rule, the information from the input register is shifted in in accordance with the number of bits that have been selected for rejection. This shifting is carried out by way of the circuitry of FIGURE 8 in the manner described in connection with the normal information processing operation. Thus the information will be read into the information distribution circuitry of FIGURE 2.

In order to prevent the decoding of the information, the monitor bits normally inserted into the decoder circuitry of FIGURE 12 and 13 will be inhibited in the primary timer circuit of FIGURE 4. The inhibiting of this monitor bit is effected by the circuitry of FIGURE 10 wherein the reject rules supply a signal to the core M356 and then into the core M357 to inhibit the latter from operating as a flip-flop. Thus there will be no output from the core M357 passing to the core M361. With no signal on the core M361, the subsequent shift will provide no write-in to the core M239 of FIGURE 4; the latter being the signal for generating the monitor bits for the decoder in the cores M240.

Inasmuch as no decoding will take place in the absence of the information in the information distribution circuit, no information will be processed through the decoder into the output register.

The functioning of the apparatus during the cycle immediately following the reject cycle will be the rule selected at time T11 of the cycle immediately preceding the reject cycle. It will be apparent that this rule may be a further reject rule or may be a process rule.

Next to be discussed is the functioning of the apparatus when an end word rule has been selected by the programmer. As described more fully in the co-pending application of Charles J. Barbagallo, et al. the input in the input register may be arranged as a series of machine words. Each word comprises forty-eight information bits and four additional bits in the form of a weight count which is appended to the information, the weight count bits being used for checking purposes. Further, the information is handled eight machine words at a time in the input register with a total of sixteen words being used to define a particular statement which is sometimes referred to as a blockette of information. The words are read from a suitable information source with words 9 through 16 being read first into the input register with the words 1 through 8 falling in the next subsequent read.

It will be seen that after each word, certain steps must be taken to recognize that a machine word has been processed. This places a requirement on the programmer to plug into the processing program an end word rule. The end word rule, for example, provides for the shifting from the input register those bits which do not represent information but do represent weight count bits and other control bits which may be used in related circuitry not discussed or shown herein. The weight count bits may be fed to suitable weight count circuitry not shown or they may be discarded. The other control bits may be examined but are not processed through the decoder circuits.

Because of the nature of the apparatus used in supplying information to the input register, different end word rules are provided to supply the desired control required for the processing of the information. Thus, the apparatus includes a rule $\overline{EW_{1\ v\ 9}}$ which is used at the end of each machine word processed from the input register except the words 1 and 9. The end word 9 signal $EW_9$ is selected by the plugboard to provide a signal at the end of the ninth word processed. In a similar manner, the signal $EW_1$ is selected to provide a signal at the end of the word number 1 of the wors to be processed. In the described apparatus, the high number word is processed first so that the last word processed will be the word 1.

The end word rule discussed first is the rule $\overline{EW_{1\ v\ 9}}$. This rule will be detected at the time that the other words are decoded and this will be T5 in the normal twelve pulse period cycle or T11 when the next cycle to be performed is a rejected cycle.

At time T7, the end word signal $\overline{EW_{1\ v\ 9}}$ will set the core M450 in FIGURE 18D and at time T8, the core M488 will be set so that it will operate as a flip-flop. At time T8, the end word core M323 will be set in FIGURE 10. Further, the change of rule storage core M326 will be set by a signal supplied by way of the core M322.

After time T9, the process rule core M356 and M359 will have signals supplied thereto so that the storage circuit M357 will be inhibited and a write-in to the core M358 will likewise be inhibited. The end word rule will also be applied to the core M360, the latter supplying an inhibit signal to the core M361 so that no output signal will be supplied to the primary timer by way of core M361.

Between the time T9 and T12 plus 1, a signal will be generated by way of the cores M325 and M327 to reset the process rule distribution ring and the input register distribution ring of FIGURES 8 and 11, respectively.

At time T12, the EW storage core or end word storage core M486 of FIGURE 18C will be reset. Further, a reset signal will be supplied to the core M488 of FIGURE 18D which is storing the signal $\overline{EW_{1\ v\ 9}}$. The change of rule storage core M326 of FIGURE 10 will likewise be reset at time T12.

The functioning that has been discussed thus far takes place during the last half of the timing cycle immediately prior to the carrying out of the end word rule.

As viewed in FIGURE 3, the presence of the signal $\overline{EW_{1\ v\ 9}}$ will result in the primary timer being set with a signal at time T5. The insertion of the signal at the T5 stage provides an eight pulse period timing cycle in the primary timer. The signal $\overline{EW_{1\ v\ 9}}$ will further provide for supplying a control signal to the program sequence shaper 27 so that the next rule to be performed may be set up for the apparatus to handle during the timing cycle that immediately follows.

The input register shift signal will be present at time T10 on the core M349 in FIGURE 8. T10 is the timing signal from the timing cycle immediately prior to the end word operating cycle. If it is desired, as pointed out above, that eight shifts be performed in the input register so that the next information which is available on the output of the input register will be valid information. The eight shifts for this information will take place starting at time T5 and continuing through T12. The shifting of the input register will continue until the shift stop signal is supplied by the next rule generated after the end word rule. Thus, when an end word rule is to be performed and this rule is followed by a process rule which may be a six bit process rule, a total of fourteen shifts will be made in the input register.

It will be apparent that the following of the $\overline{EW_{1\ v\ 9}}$ signal that the processing will continue in accordance with the program that has been selected by the programmer by way of the plugboard.

The end word signal $EW_1$ and $EW_9$ from the plugboard program perform certain additional functions in the apparatus, some of which are discussed in detail in the co-pending application of Charles J. Barbagallo, et al. supra. On both the $EW_1$ and $EW_9$ operations, the input register is shifted twenty-eight times. The number of shifts is determined by inserting a monitor bit into a section of the input register where there is no inforcation and picking this monitor bit out of the register circuit twenty-eight pulse periods later. The monitor bit is inserted into the core M347, when picked off of the input register, to cut off the shifting of the input register circuit as illustrated in FIGURE 8. The monitor bit is also used to stop the clock pulses by closing the clock gate 61 of FIGURE 20 by way of the core M428 in FIGURE 17.

The $EW_9$ signal is also used to supply a signal for reading more information into the input register as discussed more fully in the Barbagallo, et al. application.

The end word signal $EW_1$ is programmed to indicate that the last word in a particular blockette has been processed. In addition to effecting the twenty-eight shifts of the input register, the output register is also shifted so that the first column into the output register will be shifted to the 120th column register. After twenty-five input register shifts, a stop signal will be applied to the core M347 of FIGURE 8 which will set up the circuits for the input register so that the register shifting will stop after twenty-eight shifts.

The output register shifting is started by the monitor bit derived from the input register. This monitor bit is used to set the core M370 in FIGURE 10. The core M370 is connected as a flip-flop and will supply a series of ones which will activate the output register shapers R1 and R2. The R1 and R2 shapers will continue to function until the monitor bit which has been inserted into the output register stops the clock pulses by closing the clock gate 61 of FIGURE 20.

The output register monitor bit will be picked out of the output register circuitry by way of the cores R165 and R166 of FIGURE 15 and passed through the one and only one circuit of FIGURE 17. From the one and only one circuit formed by the cores R140, R141 and R452, a single bit will be passed to the cores R139 and R144. This bit is then shifted along to form the ORS signals which indicate to the apparatus that the processing of the information in the output register is complete. Thus the ORS₁₂ signal is applied to the clock gate 61 by way of the core M528 to stop the clock pulses which are shifting the output register. At this point, the information in the output register will have been shifted so that the informaion to be read out will be stored in the right hand portion of the register as viewed in FIGURE 15.

After the final positioning of the information is completed in the output register, the circuit is ready for a readout to the printer or punch associated therewith. The shifting out may be effected by a timing cam in the printer which will produce twelve timed pulses for the initial reading of the twelve levels of the Hollerith code in the output register.

As the readout is taking place by way of the thyratron-relay circuits, FIGURES 15 and 16, the information is being recirculated back into the individual column registers so that after twelve shifts have been made the information will be arranged in the output register as it was just prior to the readout. The information may be read out again from the output register by a further cammed readout from the printer, or the apparatus may be stepped into the next processing cycle at which time the information on the output register will be shifted serially out to the readout line of the output register for checking purposes.

The checking of the output register by the circuit of FIGURE 19 is considered more fully here. As discussed above, the counter stage 17 receives an input by way of the decoder check circuit 13, which is a duplicate of the decoder 12 described in detail herein. The input is by way of the line R133 which is an output line from the decoder check circuit 13. The signals fed in are the signals which represent the active positions developed for the Hollerith code in the decoder circuit. The counter 17, during the checking operation is counting modulo 4 and at the end of the decoding operation will be set to a count of the active signals produced by the decoder and reduced modulo 4. When the IS₂ signal appears, the count will be transferred into the second stage storage circuit 19. The storage circuit 19 will hold the count until the counter 18 has produced a count of the information read serially out of the output register by way of the output register cores R172 and R173 in FIGURE 15.

The counter 18 will continue to operate modulo 4 until the information last read from the output register has been read through the counter. At a selected time, the counters have each counted to the same number, if there has been no error, and the comparison circuit 20 will have no output or readin into core M551 when the signal ORS₉ is present. Further, there will be no output or readin into the core R232 when the signal ORS₁₀ is present. This will mean that there will be no output to the indicating circuits that may be connected to the cores M551 or M552. If an error is indicated by the presence of a signal on the output of either of the cores M551 or M552, the apparatus may be stopped as by way of the thyratron relay connected to the output of the core M552.

The storage circuit 19 will be reset by a signal ORS₉ and ORS₁₀ applied to the inhibit windings of the cores R207 and R200. The apparatus will then be conditioned to receive the next count from the counter 17 which is taking place as the information is being read into the output register.

It will be apparent that when the first reading operation and decoding operation is taking place at the start of a particular run, that the counter 17 will be counting the information passed out of the decoder. However, the storage circuit 19 will not be set with this information until after the decoding has been completed. Since the storage circuit 19 will initially be storing zeroes, no information will be read into the counter 18 so that the counter 18 is also storing zeroes, no error will be indicated in the checking circuits. On the processing cycle that follows, the storage circuit 19 will be set and the counter 18 will be counting the information passed into the output register on the previous processing cycle. Consequently, the check made will be completed at the end of the second processing cycle.

While, in accordance with the provisions of the statutes, there has been illustrated and described the best form of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. In a data processing apparatus the combination comprising a first register adapted to store digital data in a first code, a second register adapted to store digital data in a second code, code converting means connected between said first and second registers, and means including a shift register connected to the input of said second register, said shift register adapted to have digital data moved therein in one or the other of two directions to thereby control the direction of movement of the digital data into said second register.

2. A programmed data processing apparatus comprising a first storage register adapted to store digital data in a first code, a programmed decoder having an input connected to the output of said first storage register and an output, a second storage register connected to the output of said programmed decoder, a selectively operated program controller connected to said programmed decoder so that said decoder will decode data from said first storage register and insert the decoded data in said second storage register, and at least one decoding rule signal source connected to said program controller, said decoding rule signal source when energized being effective in initiating the transfer of information from said first storage register into said programmed decoder and for determining the program identity of the decoding operation.

3. Apparatus according to claim 2 wherein said decoding rule signal source further comprises a plugboard having a plurality of signal outlets, and means including connections on said plugboard to selectively activate said signal outputs.

4. Apparatus according to claim 3 wherein said last-named means further comprises a plurality of independently activated rule generating circuits adapted when activated to transfer selected and variable amounts of data from said first storage register to said programmed decoder.

5. In an apparatus for programming a data processing machine the combination comprising a serial shift register adapted to have a signal inserted therein at a predetermined position, a plurality of output terminals positioned at selected spaced points along said serial shift register, a plurality of program rule generating circuits, means for operatively connecting selected ones of said rule generating circuits to the terminals along said serial register, and a shift signal source connected to shift the signal in said serial shift register along the length thereof so that the signal in said serial shift register will be read into the next stage thereof and to an associated rule generating circuit each time a shift signal is applied to said serial shift register.

6. In an apparatus for programming a data processing machine the combination comprising a serial shift register adapted to have a signal inserted therein at a predetermined position, a plurality of output terminals positioned at selected spaced points along said serial shift register, a plurality of program rule generating circuits, a plugboard adapted to be manually plugged so that selected ones of said rule generating circuits are selectively connected to the terminals along said serial shift register, a repeat rule circuit connected to said plugboard and adapted to be manually plugged so that any one of the program rules may be repeated, and a shift signal source adapted to shift the signal in said serial shift register along the length thereof so that the signal in said serial shift register will be read into the next stage thereof and to a selected rule generating circuit or said repeat rule circuit each time a shift signal is applied to said serial shift register.

7. In an apparatus for programming a data processing machine the combination comprising a serial magnetic core shift register adapted to have a signal inserted therein at a predetermined position, a pair of output terminals connected to selected ones of the cores along said serial magnetic core shift register, a plurality of program rule generating circuits each comprising bistable magnetic cores having a pair of input windings, a plugboard adapted to be manually plugged so that selected ones of the input windings of said rule generating circuits are selectively connected with said output terminals connected to said serial magnetic core shift register, a pair of terminating circuits for the shifted signal in said serial register connected one each to one each of the pair of windings of said bistable magnetic cores of said rule generating circuits, switch means for activating one or the other of said pair of terminating circuits, and a shift signal source connected to shift the signal in said serial magnetic core shift register along the length thereof so that the signal in said serial magnetic core shift register will be read into the next stage of said register and to a selected rule generating circuit each time a shift signal is applied to said serial magnetic core shift register.

8. Apparatus according to claim 7 including control means connected to said serial magnetic core shift register and to said switch means, said control means capable of activating said switch means when a signal is shifted from a predetermined one of the stages of said serial magnetic core shift register.

References Cited by the Examiner
UNITED STATES PATENTS

| | | | |
|---|---|---|---|
| 2,620,395 | 12/1952 | Snijders | 340—347 |
| 3,011,165 | 11/1961 | Angel et al. | 340—347 |

ROBERT C. BAILEY, *Primary Examiner.*

M. LISS, P. J. HENON, *Assistant Examiners.*